US 6,730,733 B2

(12) United States Patent
Overbeek et al.

(10) Patent No.: US 6,730,733 B2
(45) Date of Patent: May 4, 2004

(54) AQUEOUS POLYMER COMPOSITIONS

(75) Inventors: Gerardus Cornelis Overbeek, Waalwijk (NL); Pablo Steenwinkel, Waalwijk (NL); Ronald Tennebroek, Waalwijk (NL); Tijs Nabuurs, Waalwijk (NL)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 10/220,141

(22) PCT Filed: Mar. 3, 2001

(86) PCT No.: PCT/EP01/02450

§ 371 (c)(1),
(2), (4) Date: Aug. 28, 2002

(87) PCT Pub. No.: WO01/66659

PCT Pub. Date: Sep. 13, 2001

(65) Prior Publication Data

US 2003/0055171 A1 Mar. 20, 2003

(30) Foreign Application Priority Data

Mar. 9, 2000 (GB) ............................................ 0005612

(51) Int. Cl.$^7$ ................................................ C08F 20/18
(52) U.S. Cl. ................... 524/515; 524/512; 524/502; 524/507; 524/542; 524/592; 524/590; 524/602; 522/92; 522/94; 522/100; 522/109; 522/112
(58) Field of Search ................. 524/512, 502, 524/507, 515, 542, 592, 590, 602; 522/92, 94, 100, 109, 112

(56) References Cited

U.S. PATENT DOCUMENTS

| 4,107,013 | A | | 8/1978 | McGenniss et al. | |
|---|---|---|---|---|---|
| 5,141,983 | A | * | 8/1992 | Hasegawa et al. | .......... 524/457 |
| 5,567,761 | A | * | 10/1996 | Song | .......... 524/523 |
| 5,614,582 | A | * | 3/1997 | Hori et al. | .......... 524/507 |
| 5,712,339 | A | * | 1/1998 | Guerin et al. | .......... 524/515 |

FOREIGN PATENT DOCUMENTS

| EP | 0 736 573 | 10/1996 |
|---|---|---|
| EP | 0 700 424 | 9/1997 |
| WO | 94/28077 | 12/1994 |

* cited by examiner

Primary Examiner—David W. Wu
Assistant Examiner—Satya B Sastri
(74) Attorney, Agent, or Firm—Morgan, Lewis & Bockius LLP

(57) ABSTRACT

Aqueous polymer composition suitable for coating which comprises the following components dispersed in water: (1) a combination of an acrylic polymer(s) A and an acrylic polymer(s) B where polymer(s) A has a Tg of not more than 30° C. and polymer(s) B has a Tg of at least 35° C., more preferably at least 45° C., which is at least 25° C. higher than the Tg of polymer(s) A, and wherein one or both of polymers A and B bear crosslinker functional groups capable of imparting ambient-temperature crosslinkability to component (1) in a coating formed from the composition via the formation of non-radically-formed covalent bonds; and (2) a self-dispersible, ionically stabilised polymer having olefinically unsaturated bond functionality capable of imparting radiation-curability (preferably uv-radiation curability) thereto in a coating formed from the composition.

43 Claims, No Drawings

AQUEOUS POLYMER COMPOSITIONS

The present invention relates to certain dual-cure polymer compositions, their use in coating, and coatings derived therefrom.

There is an ongoing demand to provide aqueous polymer compositions suitable for coatings which have an excellent balance of properties, such as for example good dispersion stability of the components of the compositions, good chemical and solvent resistance of coatings formed from the compositions, and a combination of facile film formation (i.e. low minimum film forming temperature MFT, preferably ambient temperature or below) as well as good hardness and blocking resistance in coatings formed from the composition at low or no coalescent aid requirement in the composition (these being organic solvents or plasticisers which assist film formation but may be undesirable for environmental reasons).

We have now discovered certain aqueous compositions having such an excellent balance of properties as mentioned above.

According to the present invention there is provided an aqueous polymer composition suitable for coating which comprises the following components dispersed in water:
(1) a combination of an acrylic polymer(s) A and an acrylic polymer(s) B where polymer(s) A has a Tg of not more than 30° C. and polymer(s) B has a Tg of at least 35° C., more preferably at least 45° C., which is at least 25° C. higher than the Tg of polymer A, and wherein one or both of polymers A and B bear crosslinker functional groups capable of imparting ambient-temperature crosslinkability to component (1) in a coating formed from the composition via the formation of non-radically-formed covalent bonds; and
(2) a self-dispersible, ionically stabilised polymer having olefinically unsaturated bond functionality capable of imparting radiation-curability thereto in a coating formed from the composition.

There is also provided according to the invention a method of coating a substrate using an aqueous polymer composition as defined above.

There is further provided according to the invention a coating obtainable or derived from an aqueous composition as defined above.

There is further provided according to the invention a substrate having a coating obtainable or derived from an aqueous composition as defined above.

Aqueous polymer dispersions for coatings which comprise two polymers of differing Tg, one having a Tg of not more than 10° C. and the other having a Tg>25° C., and also a multi functional material having at least two ethylenically unsaturated groups which can each participate in a free-radical initiated addition polymerisation, are known from EP-A-0736573. The dispersions are said to be curable by heat or radiation. In addition, the polymers of differing Tg may bear groups for grafting or crosslinking purposes, although these are not employed in the worked examples. The multifunctional material is said at page 4 lines 30 to 32 to be either not emulsified or emulsified in the water of the polymer dispersion, and in the latter case it may be emulsified with the aid of surfactants such as those used in aqueous emulsion polymerisation. While it is further stated at page 4 lines 7 to 12 that the multifunctional compounds may incorporate internal hydrophilic components to facilitate such emulsification (although this is not exemplified in a worked example), the earlier-stated requirement to also employ external surfactant when emulsification is required is not said to be negated, so the multi-functional compound of EP-A-0736573 even when containing internal hydrophilic components is not self-dispersible as defined in this specification (see later). We have found that the aqueous compositions of the present invention surprisingly provide improved properties in comparison to the type of composition taught in EP-A-0736573, and in particular improved resistance to blocking of coatings made from the compositions, both before and after radiation curing, and improved dispersion stability.

For the purposes of this invention, by an "aqueous polymer composition" is meant a dispersion of polymers of components (1) and (2) in a liquid carrier medium of which water is the principal component (at least 50 weight %, more usually at least 80 weight %). Minor amounts of organic liquids may optionally be present although it is preferred that the aqueous composition is substantially solvent-free, by which is meant that the composition contains less than 5 wt % of organic solvent(s) based on total polymer solids, more preferably less than 2 wt %, and most preferably no solvent at all. (In this specification organic plasticisers are intended to be within the scope of the term "solvent"; these, like coalescent solvents, are also used in the art to decrease MFT although strictly speaking they are not solvents).

The invention composition will typically comprise colloidally dispersed particles of the polymers of components (1) and (2), i.e. will typically be in the form of an aqueous polymer latex.

The MFT of the invention composition is preferably less than 35° C., and is particular ambient temperature or below. By ambient temperature is meant herein a temperature within the range 10 to 25° C.

The crosslinker functional groups of the acrylic polymer(s) of component (1) are usually chain-pendant and/or terminal. The groups on the polymer of component (2), which provide radiation curability are olefinically unsaturated bonds and are usually chain-pendant and/or terminal, but may also be in-chain.

The aqueous invention composition may be termed a "dual-cure" composition because the polymers of components (1) and (2) are crosslinkable, after forming a film from the composition, by different crosslinking mechanisms, as will now be explained (although, as will also be explained, in some embodiments of the invention, the polymer of component (2) takes part in the crosslinking of the polymer(s) of component (1) as well as crosslinking by a different crosslinking mechanism).

In component (1), one or both of acrylic polymers A and B bear crosslinker functional groups, i.e. groups which can impart ambient-temperature crosslinkability to this component via the formation of non-radically-formed covalent bonds, by which we mean herein covalent bonds which are formed other than by a free-radical addition mechanism (auto-oxidation being considered as forming bonds by a free radical mechanism for the purposes of this invention, ie such bond formation being excluded from the scope of the invention) or by an anionic or cationic addition polymerisation mechanism. (However, crosslinking by coordinate bond formation as e.g. by lone electron pair donation from groups such as carboxyl groups (oxygen atoms thereof) to acceptor shells of metal ions of appropriate metal compounds is intended to be within the scope of the term non-radically-formed covalent bonds). To form such bonds, such crosslinker groups must undergo reaction with other groups borne by compounds already present in the composition or which are subsequently added thereto. (In the case of coordinate bond formation the lone pair of atoms of crosslinker groups coordinate to acceptor metal ion shells of already present or subsequently added metal compounds).

In the most preferred embodiment of the invention (embodiment X for future reference), one or both of polymers A and B carry crosslinker groups and the composition contains, or is subsequently mixed with, an external crosslinking agent having 2 or more groups (or in the case of coordinate bond formation, an acceptor metal ion shell—see eg EP-A-6547 and U.S. Pat. No. 2,904,526) which are reactable with the crosslinker groups on polymers A and/or B to form the crosslinking covalent bonds. By "external" is meant that the crosslinking agent is exclusive of the polymers of components (1) and (2) (i.e. is not provided by any of these polymers).

For the achievement of ambient-temperature crosslinkability in embodiment X it is preferred that the crosslinker groups on the polymers A and/or B are carbonyl groups (by which is meant, unless otherwise specified, the carbonyl functionality of a ketone or aldehyde group), and the groups reactive therewith of the external crosslinking agent are carbonyl-reactive amino groups, with the converse situation also in principle being feasible (i.e. carbonyl-reactive amino groups on the polymers A and/or B and carbonyl groups on the external crosslinking agent) but less preferred.

By an amino group is meant herein a carbonyl reactive group of the formula —$NH_2$ or —NH—, or a carbonyl-reactive group derived therefrom, and for the purposes of this invention is intended to embrace groups of formula —$NHNHR^1$ (where $R^1$ is H or lower alkyl of 1–5 carbon atoms, preferably methyl), more commonly known as hydrazine functional groups, or carbonyl-reactive hydrazone groups derived therefrom (when $R^1$ is H), as well as —$NH_2$ or —NH— groups which are bound only to a carbon atom(s) (i.e. conventional primary or secondary amine groups), or carbonyl-reactive groups derived therefrom (e.g. by reaction with a ketone of three or more carbon atoms). The amino group could also be bound to an oxygen atom.

Hydrazine functional groups are often part of larger groups such as acid hydrazide groups and semi-carbazide groups.

Another possibility for embodiment X is that the crosslinker groups on the polymers A and/or B are carboxyl groups and the groups reactive therewith of the external crosslinking agent are aziridine groups (a cyclic —NH— containing group), with the converse situation also in principle being feasible (i.e. aziridine groups on the polymers A and/or B and carboxyl groups on the external crosslinking agent) but less preferred.

A further possibility for embodiment X (as indicated above) is that lone pairs of electrons of oxygen atoms of carboxyl groups on polymers A and/or B (the crosslinker groups) form coordinate covalent crosslinking bonds on coating formation by donation to acceptor metal ion shells of an added metal compound (the external crosslinking agent) such as zinc cations added as zinc oxide. (The lone pair of an oxygen atom of a carboxyl group is thought to be delocalised between the two oxygen atoms of the group, so that bidentate coordinate bonding to a zinc cation is thought to occur on coating formation.)

The above examples given for effecting crosslinking in embodiment X are not intended to be limiting and a more comprehensive list for the possible groups on polymers A and/or B (on the one hand) and the external crosslinking agent (on the other) is as follows: ketone(non enolic) and polyhydrazide; ketone(non enolic) and polyamine; acetoacetoxy and polyhydrazide; acetoacetoxy and polyamine; silane and polysilane; hydroxyl and polyisocyanate (optionally blocked); hydroxyl and melamine; carboxyl and polyepoxy; epoxy and polycarboxyl; carboxyl and carbodiimide; amine and polyepoxy; carboxyl and metal ion (for coordinate bonding); carboxyl and polyaziridine; carboxyl and epoxysilane; amine and epoxysilane.

Specific examples of methods for incorporating crosslinker groups on polymers A and/or B and specific examples of crosslinking agents will be given later in this specification.

In another embodiment of the invention (embodiment Y for future reference), each polymer A and B carries different crosslinker groups which are reactable with each other (co-reactable) to form the covalent bonds leading to crosslinking. In this embodiment, therefore, there is no requirement for the presence of an external crosslinking agent, although one may still be present if desired (providing groups which react with the crosslinker groups on polymers A and/or B). The different (co-reactable) crosslinker groups borne by polymers A and B will usually be restricted to be being carried only on one or other of the polymers A and B, i.e. polymer A will carry only one of two types of co-reactive group, while polymer B will carry only the other type of co-reactive groups. However, it is feasible in this embodiment for one or both of polymers A and B to carry both types of co-reactive groups.

For the achievement of ambient temperature crosslinkability in this embodiment, it is preferred that the co-reactive crosslinker groups are, respectively, carbonyl groups and carbonyl-reactive amino groups, or silane and hydroxyl groups. The nature of the carbonyl reactive amino groups has been discussed in the embodiment X detailed above; however typically they are provided by pendant amino ester groups which may be formed by imination of a precursor carboxyl functional polymers (see below the discussion of embodiment Z for a fuller discussion of this).

It may be mentioned that carbonyl groups and carbonyl reactive amino groups are believed to react with each other to form azomethine groups or possibly enamine groups in the case when the carbonyl group is an enolic carbonyl group (as e.g. in an acetoacetate group). However we do not wish to be bound by these views regarding the specific type of covalent bond formation between the carbonyl and amino groups.

The above examples for achieving crosslinking in embodiment Y is not intended to be limiting, and a more comprehensive list for the possible co-reactive groups on polymers A and B in this embodiment is as follows: silane and hydroxyl; acetoacetoxy and and amine; ketone(non enolic) and amine; acetoacetoxy and hydrazide; ketone(non enolic) and hydrazide; carboxyl and epoxy; hydroxyl and isocyanate (optionally blocked); hydroxyl and methylol (meth)acrylamide. It may be mentioned that the polymer of component (2) could optionally bear one or other of the co-reactive crosslinker groups.

In a further embodiment of the invention (embodiment Z for future reference) one or both of the acrylic polymers A and B carry crosslinker groups of the type which are reactable with the groups on the polymer of component (2) which impart radiation curability thereto—i.e. olefinically unsaturated bonds. In effect, some of the polymer of component (2) acts as an internal crosslinking agent for the reaction with the crosslinker groups on one or both of polymers A and B, with the remainder providing the radiation—curability of the polymer composition.

In this embodiment it is preferred that the crosslinker groups on one or both of the polymers A and B are primary or secondary amine groups which have been discussed above in relation to the other embodiments X and Y, while the groups reactable therewith on the polymer of component (2) are olefinically unsaturated bonds (preferably being provided by acryloyl, fumaric or maleic groups) with covalent bond formation being effected by Michael addition of the amino groups to the unsaturated bonds. The provision of amine groups on the acrylic polymer(s) of component (1) may for example be effected by reacting a precursor polymer bearing chain pendant carboxyl groups with an alkylene imine (particularly ethylene imine or propylene imine) to form (from the carboxyl groups) pendant amino ester groups which are terminated by primary amine groups; this reaction is commonly called an imination reaction, with the so formed acrylic polymer being termed herein an iminated acrylic polymer.

The above mentioned possibility for the crosslinker groups on one or both of polymers A and/or B in embodiment Z is not intended to be limiting, and such groups could eg also be mercaptane groups or acetoacetoxy groups.

In yet a further embodiment of the invention (embodiment Q for future reference) one or both of the acrylic polymers A and B of component (1) carry crosslinker groups, and the radiation curable polymer of component (2) also carries crosslinker groups (preferably the same as those of polymer A and/or B of component (1)), these not being the olefinically unsaturated groups which impart radiation curability to the polymer of component (2), and the composition contains, or is subsequently mixed with, an external crosslinking agent having 2 or more groups (or a crosslinking metal ion for coordinate bond formation) which are reactable with the crosslinker groups on polymers A and/or B and on the polymer of component (2) to form the crosslinking covalent bonds. In this embodiment the non-radical covalent crosslinking of component (1) does not affect the unsaturated double bonds of the polymer of component (2).

In embodiment Q, the crosslinker groups on polymer A and/or polymer B of component (1) and the crosslinker groups on the polymer of component (2) (for reacting with an external crosslinking agent) are usefully carboxyl groups, and the groups reactive therewith of the external crosslinking agent are usefully aziridine groups. Another useful crosslinking system for embodiment Q has carboxyl groups on one or both of acrylic polymers A and B and on the polymer of component (2), and metal ions from an external crosslinking agent (for coordinate bond formation).

In an alternative version of embodiment Q, one or both of the acrylic polymers A and B of component (1) on the one hand bear crosslinker groups and the polymer of component (2) on the other hand bears co-reactive crosslinker groups (these not being the olefinically unsaturated groups for imparting radiation curability to polymer (2)). For example one both acrylic polymers could bear carbonyl groups and the polymer of component (2) could bear hydrazide or semicarbazide groups (if polymer (2) was a polyurethane—see later—these groups could eg be introduced by overextension of an isocyanate terminated urethane prepolymer). In this version of embodiment Q, an external crosslinking agent is not required (but may be present if desired).

The above possibilities given for achieving crosslinking in embodiment Q is not intended to be limiting. A more comprehensive list (where external crosslinking agent is required) for possible groups on polymers A and/or B and on polymer of component (2), on the one hand, and on an external crosslinking agent on the other, is as follows: carboxyl and metal ion; carboxyl and aziridine; carboxyl and carbodiimide; carboxyl and (poly)epoxy; hydroxyl and isocyanate (optionally blocked); hydroxyl and melamine; hydroxyl and silane; hydroxyl and methylol(meth) acrylamide; ketone(non enolic) and hydrazide; ketone(non enolic) and amine; acetoacetoxy and hydrazide; acetoacetoxy and amine; silane and silane; epoxy and amine; epoxy and mercaptane. Note that the groups on A and B (if both bear them) are not necessarily the same. In the alternative version of embodiment Q (not requiring external crosslinking agent), the groups on polymers A and/or B on the one hand, and on the polymer of polymer (2) on the other, could be: ketone(non enolic) and hydrazide; acetoacetoxy and hydrazide.

It will be appreciated that one or more of the embodiments X, Y, Z and Q could be operative at the same time in the invention composition.

The radiation-curability of the polymer of component (2) results (as mentioned above) from the presence of olefinically unsaturated bonds, and takes place by a free-radical mechanism. Such bonds may e.g. be contained in (meth) acryloyl groups pendant or chain terminal to the polymer chain.

The radiation used for crosslinking (i.e. curing) the polymer of component (2), after drying, may be provided by any suitable form of radiant energy, but is preferably ultra-violet (uv) radiation. In principle, electron-beam (eb) radiation or (in some cases) visible radiation could be used. When crosslinking is effected by uv radiation (or visible radiation), the composition will normally include at least one photoinitiator (or sensitizer), usually present in an amount 0.1 to 10% by weight, based on the solid polymer weight of component (2). Examples of uv photoinitiators include halogenated polynuclear ketones such as chlorosulphonated benzanthones, chlorosulphonated fluorenones, alpha-haloalkylated benzanthones, alpha-haloalkylated fluorenones and alkyl phenones. Accelerator compounds may be included if desired to enhance the cure rate. (When curing is to be effected by eb radiation, photoinitiator is not required).

After the invention composition has been applied to a substrate to form a coating, and before, during and/or after drying the applied wet film, usually during and/or after drying (drying often being effected, at ambient temperature, although this may be accelerated if desired by the application of heat) crosslinking occurs at ambient temperature in the polymer component (1), although the crosslinking rate may be accelerated if desired by heating at an elevated temperature. Radiation crosslinking of the polymer of component (2) will occur when the coating is subjected to suitable radiation, and, again this can be done before, during and/or after drying the applied wet film (usually shortly after drying). To effect the radiation curing of component (2), the aqueous phase of a wet film of the composition is sometimes flashed off quickly (at an elevated temperature) to dry the composition before applying radiation at ambient (or a higher) temperature. Curing by radiation will take place far more rapidly than curing by non-radically-formed covalent bond formation.

Turning more specifically to the acrylic polymers A and B of component (1). An acrylic polymer(s) A having a Tg of not more than 30° C. is termed herein a "soft" polymer for convenience, while an acrylic polymer(s) B having a Tg of at least 35° C. (more preferably at least 45° C.) is termed herein a "hard" polymer for convenience. Preferably a soft acrylic polymer has a Tg within the range of from −60 to 30° C., more preferably from −20 to 15° C., and a hard acrylic polymer preferably has a Tg within the range of from 35 to 125° C., more preferably 45 to 125° C., and still more preferably 50 to 100° C. The Tg of the hard polymer should be at least 25° C. higher than that of the soft polymer, more preferably at least 40° C. higher, and especially preferably at least 50° C. higher. The weight ratio of soft to hard acrylic polymers is preferably within the range of from 30/70 to 90/10, more preferably from 40/60 to 80/20.

The acrylic polymers of differing Tg (as defined) may be present in the composition as a single blend of preformed (separately prepared) polymers, or, more preferably, as a sequentially-formed composition of the polymers, whereby one acrylic polymer has been prepared (by polymerisation of its constituent monomers) in the presence of another, preformed, acrylic polymer (possibly, but not necessarily, resulting in the acrylic polymers being in a core/shell particle arrangement), again so that there is a Tg difference (as defined) between the acrylic polymers.

In embodiment X of the invention, the amount of crosslinker groups (present on one or both of polymers A and B) preferably corresponds to a presence of such groups in the range of up to 1.25 mmoles of such groups/g of the polymers A and B combined, more preferably up to 1.0 mmoles of such groups/g of polymers A and B combined, most preferred up to 0.6 mmoles of such groups/g of polymers A and B combined. The amount of external crosslinking agent preferably corresponds to the following stoichiometric amounts: 0.05 to 1.5 SA (ratio of equivalents of component (1) crosslinker groups to equivalents of external crosslinker crosslinking groups, or in the case of coordinate bond formation, to equivalents of acceptor metal ion), more preferably 0.1 to 1.0 SA.

In embodiment Y of the invention, the amount of each co-reactive type of crosslinker group preferably each corresponds to a presence of such groups in the range of up to 1.0 mmoles of such groups/g of the polymers A and B combined, more preferably up to 0.8 mmoles of such groups/g of polymers A and B combined.

In embodiment Z of the invention, the amount of crosslinker groups on one or both polymers A and B preferably corresponds to a presence of such groups in the range of up to 1.0 mmoles of such groups/g of the polymers A and B combined, more preferably up to 0.8 mmoles of such groups/g of polymers A and B combined.

In embodiment Q of the invention (where external crosslinker is required), the amount of the non radical covalent bond-providing crosslinker groups present on one or both of polymers A and B and on the polymer of component (2) preferably corresponds to a presence of such groups in the range of 0.05 to 2.0 mmoles of such groups/g of polymers A, B and the polymer of component (2) combined, more preferably 0.1 to 1.5 mmoles of such groups/g and most preferred 0.2 to 0.9 mmoles of such groups. The amount of external crosslinking agent preferably corresponds to 0.05 to 1.5 SA (ratio of equivalents of crosslinker groups on component (1) and component (2) polymers to equivalents of external crosslinker crosslinking groups), more preferably 0.1 to 1.0 SA.

By an acrylic polymer herein is meant a homo- or copolymer derived from the addition polymerisation (using a free radical initiated process and usually in an aqueous medium) of a monomer composition comprising at least 40 weight % of one or more monomers of the formula

$$CH_2=CR^2COOR^3 \qquad 1$$

where $R^2$ is H or methyl, and $R^3$ is optionally substituted alkyl of 1 to 20 carbon atoms (more preferably 1 to 9 carbon atoms) or cycloalkyl of 5 to 20 carbon atoms. Such monomers are referred to herein as acrylic monomers. More preferably, the monomer composition contains at least 50 weight % of acrylic monomer(s), and particularly at least 60 weight %. Examples of such acrylic monomers include methyl acrylate, methyl methacrylate, ethyl acrylate, ethyl methacrylate, n-butyl acrylate, iso-butyl acrylate, n-butyl methacrylate, iso-butyl methacrylate, 2-ethylhexyl acrylate, 2-ethylhexyl methacrylate, isopropyl acrylate, isopropyl methacrylate, n-propyl acrylate, n-propyl methacrylate, dodecyl methacrylate, dodecyl acrylate, stearyl methacrylate and stearyl acrylate.

One or both of the soft acrylic polymer A and the hard acrylic polymer B must of course contain crosslinker functional groups, and these are preferably derived from olefinically unsaturated monomers employed in the polymerisation bearing a required crosslinker group(s) (crosslinker monomers for convenience), or a precursor group(s) which is subsequently converted to a crosslinker functional group(s) after polymerisation.

In embodiment X, the crosslinker functional groups could be eg carbonyl groups, and crosslinker monomers for providing such groups are suitably non enolic keto and aldehyde functional monomers such as acrolein, methacrolein, methyl vinyl ketone, and diacetone acrylamide, and enolic carbonyl monomers such as the acetoacetoxy esters of hydroxyalkyl (usually C1 to C12) acrylates and methacrylates, examples of which are acetoacetoxyethyl methacrylate and acrylate, and acetoacetoamidoethyl methacrylate. Other possible crosslinker groups include carboxyl groups, and crosslinker monomers for providing such groups include olefinically unsaturated mono or dicarboxylic acids such as acrylic acid, methacrylic acid, 2-carboxyethyl acrylate, fumaric acid, maleic acid, and itaconic acid.

In embodiment Y, the co-reactive crosslinker functional groups could be eg carbonyl and amino (as discussed above), and the carbonyl groups are preferably provided by using keto and aldehyde functional monomers as discussed above (examples of such monomers being given above); amino crosslinker groups are preferably provided by employing carboxylic acid-functional monomers in the polymerisation and subsequently iminating the acrylic polymer to form pendant amino crosslinker groups (as discussed above). Also hydrazinolysis can be employed to make the polymer amine functional. In embodiment Z (discussed above), the crosslinker functional groups could also be eg amino groups, and are likewise usefully obtainable by subsequent imination of carboxyl groups introduced by using a carboxylic acid functional monomer in the acrylic polymerisation.

The monomer composition to form an acrylic polymer may also include an olefinically unsaturated monomer(s) other than the acrylic monomers defined above and the crosslinker monomer(s) as discussed above and which is (are) copolymerised with one or more of such acrylic monomers and any crosslinker monomer(s) that is present. Examples of such other monomers include 1,3-butadiene, isoprene, styrene, α-methyl styrene, divinyl benzene, acrylonitrile, methacrylonitrile, vinyl halides such as vinyl chloride vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, and alkyl esters of mono-olefinically unsaturated dicarboxylic acid (such as di-n-butyl maleate and di-n-butyl fumarate. Also, in cases where they do not provide carboxyl crosslinker groups on polymer A and/or polymer B (by virtue of there being an absence of carboxyl-reactive crosslinker groups also present in or subsequently added to the composition) olefinically unsaturated monocarboxylic or dicarboxylic acids, such as acrylic acid, methacrylic acid, 2-carboxyethyl acrylate, fumaric acid, maleic acid, and itacoriic acid. It will be appreciated that such acid monomer(s) may be employed (in part or in total), once incorporated as polymerised units in the acrylic polymer, for the provision of pendant amino groups by imination of the carboxyl groups (as discussed above), particularly in embodiments Y and Z. They could however merely remain in the acrylic polymer as unreacted carboxyl groups (particularly in embodiment X) because such groups contribute to improved coating adhesion and also (when present in dissociated form) assist in dispersion stability.

Particularly preferred other monomers (i.e. other than acrylic monomers and crosslinker monomers) are selected from acrylic acid and methacrylic acid (in cases where they are not providing crosslinker groups), styrene, acrylonitrile, methacrylamide, and acrylamide.

In embodiment X (the most preferred embodiment as explained above), a typical polymer A or polymer B is derived from a monomer composition which comprises 40 to 98.5 weight % of acrylic monomer(s) (more preferably 50 to 97 weight %), 0.5 to 20 weight % of crosslinker monomer (s) (more preferably 1 to 10 weight %) and 1 to 49.5 weight % of non-acrylic, non-crosslinker monomer(s) (more preferably 2 to 35 weight %). The acrylic monomer(s) is usefully selected from one or more of methyl methacrylate, ethyl acrylate, n-butyl acrylate, n-butyl methacrylate, 2-ethylhexyl acrylate, and 2-ethylhexyl methacrylate; the crosslinker monomer(s) is usefully selected from one or both of diacetone acrylamide and acetoacetoxy ethyl methacrylate and one or more of acrylic acid, methacrylic acid and 2-carboxyethyl acrylate; and the non-acrylic, non-crosslinker monomer(s) is usefully selected from one or more of acrylic acid and methacrylic acid (in cases where such acid monomer(s) is not providing crosslinker groups), styrene and acrylonitrile.

It will be appreciated that the Tg of an acrylic polymer may be readily controlled by appropriate selection of the amounts and types of the constituent monomers thereof (in terms of the Tg's of the homopolymers which would be formed from the constituent monomers if polymerised alone and their relative amounts). Accordingly polymers A and B could be formed from the same or similar monomer systems, yet be soft or hard by appropriately varying the amounts of the constituent monomers.

The polymerisation of the monomer composition to form an acrylic polymer will normally require the use of a free-radical-yielding initiator(s) to initiate the polymerisation. Suitable free-radical-yielding initiators include inorganic peroxides such as K, Na or ammonium persulphate, hydrogen peroxide, or percarbonates; organic peroxides, such as acyl peroxides including for example benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite or Na formaldehyde sulphonate, and i-ascorbic acid. Azo compounds such as azoisobutyronitrile may also be used. Metal compounds such as Fe.EDTA (EDTA is ethylene diamine tetracetic acid) may also be usefully employed as part of a redox initiator system. An initiator system partitioning between the aqueous and organic phases, for example a combination of t-butyl hydroperoxide, iso-ascorbic acid and Fe.EDTA, may be of particular use. The amount of initiator or initiator system to use is conventional, for example within the range 0.05 to 6 wt % based on the total monomer(s) used.

An aqueous polymerisation to form an acrylic polymer normally needs to be performed in the presence of a stabilising and/or dispersing material, and when making an aqueous latex of an acrylic polymer, a conventional emulsifying agent is employed (e.g. anionic and/or nonionic emulsifiers as such as Na salts of dialkylsulphosuccinates, Na salts of sulphated oils, Na salts of alkyl sulphonic acids, Na, K and ammonium alkyl sulphates such as sodium lauryl sulphate, $C_{22-24}$ fatty alcohols, ethoxylated fatty acids and/or fatty amides, ethoxylated phenols and Na salts of fatty acids such as Na stearate and Na oleate; other surfactants include phosphates, such as the anionic/nonionic surfactant nonylphenol polyglycolether phosphate; the amount used is usually 0.1 to 5% by weight on the weight based on the total olefinically unsaturated monomer(s) used).

A buffer material, such as sodium bicarbonate, is often employed in polymerisations to form acrylic polymers.

The polymerisation process may be carried out using an "all-in-one" batch process (i.e. a process in which all the components to be employed are present in the polymerisation medium at the start of polymerisation) or a semi-batch process in which one or more of the components employed (usually at least one of the monomers) is wholly or partially fed to the polymerisation medium during the polymerisation. Seeded emulsion polymerisations, oligomer supported polymerisations and miniemulsion polymerisations may be used.

Molecular weights of polymers may be determined by using gel permeation chromatography using a polymer, e.g. styrene, of known molecular weight as a standard. Where the molecular weight of an acrylic polymer is low, so that the polymer may be considered as an oligomer (e.g. having a weight average molecular weight Mw with the range 5,000 to 100,000 g/mole, more preferably 10,000 to 50,000 g/mole), as is particularly employed when a sequential polymerisation process is being used to form polymers A and B where the first formed polymer is often an oligomer (Mw within the range defined above) and the second formed polymer is often a higher Mw polymer (e.g. Mw within the range 100,000 to 3,000,000 g/mole, more preferably 200,000 to 1,000,000 g/mole), the polymerisation to form the low molecular weight acrylic polymer is preferably performed in the presence of a chain transfer agent such as one selected from mercaptans (thiols), certain halohydrocarbons and α-methyl styrene, as is quite conventional. Cobalt chelates may also be employed.

In embodiment X of the invention, wherein an external crosslinking agent is included in, or is subsequently mixed with, the invention composition, and where, as is often preferred, the crosslinker functional groups on one or both of the polymers A and B are carbonyl groups, examples of suitable external crosslinking agents include the following: those compounds having primary and/or secondary amino groups (as these terms are conventionally understood, i.e. bound only to carbon atoms) of 2 to 10 amino groups per molecule, preferably being primary amines, and specific examples of which include ethylenediamine, propylenediamine, 4-(aminomethyl)-1,8-octanediamine, decamethylene diamine, 1,2-diaminocyclohexane, isophoronediamine, N-2(-hydroxyethyl)ethylenediamine, tris(2-aminoethyl)amine, diethylenetriamine, dipropylenetriamine, dibutylenetriamine, polyethylene imines and the polyalkylene oxide-based di or triamines commercially available with the "Jeffamine" trade mark (available from Huntsman Corporation). Also those compounds having 2 or more hydrazine-functional groups, specific examples of which include oxalic acid dihydrazide, malonic acid dihydrazide, succinic acid dihydrazide, adipic acid dihydrazide, and sebacic acid dihydrazide, cyclohexane dicarboxylic acid bis-hydrazides, azelaic acid bis-hydrazides; carbonic acid hydrazides, bis-semicarbazides, 1,4-dihyrazinobenzene, 2,3-dihydrazinonaphthalene, and dihydrazine. Preferred examples include adipic acid dihydrazide, carbonic acid dihydrazides, isophorone diamine, Jeffamine T403 (a propoxylated triamine), and 4-(aminomethyl)-1,8-octane diamine.

In embodiment X, the crosslinker functional groups on one or both of polymers (A) and (B) may also usefully be carboxyl groups, in which case the external crosslinking agent is usefully a compound having 2 or more aziridine groups (a commercially available example being Crosslinker CX-100™ ex NeoResins, The Netherlands). Also, as discussed above, the external crosslinking agent could be a metal compound, such as zinc oxide providing zinc cations which can form coordinate bonds by electron pair donation thereto from the oxygen atoms of carboxyl groups. However, such systems are not meant to be limiting and a more comprehensive list of possibilities has been given above.

In embodiment Q (where an external crosslinking agent is also employed) the covalent or coordinate bond-providing crosslinker functional groups on polymer (A) and/or (B) and on the polymer of component (2), are usefully carboxyl groups and the external crosslinking agent is usefully a compound having 2 or more aziridine groups (such as Crosslinker CX 100™) or a metal ion providing compound which will allow coordination bonding. However, such systems are not intended to be limiting and a more comprehensive list of possibilities has been given above.

Typically, the amount of an external crosslinking agent already present in, or subsequently added to, the invention composition is that to provide a range of 0.05 to 1.5 moles, more preferably 0.1 to 1.0 moles, of external crosslinker groups present per mole of covalent bond-providing crosslinker groups present on the acrylic polymer(s) of component (1), and, in the case of embodiment Q, plus the covalent bond-providing crosslinker groups of the polymer of component (2) as well. In the case of coordinate crosslinking using metal ions and carboxylic acid groups, the preferred ratio between metal ion crosslinking functionality and carboxylic acid functionality is 0.05 to 1.5 SA more preferred 0.2 to 1.0 SA, defined by metal ion crosslinking functionality to carboxylic acid functionality wherein crosslinking functionality of a zinc ion is defined as 2 and that of a carboxylic acid group as 1.

Turning now more specifically to the self-dispersible, ionically stabilised and radiation-curable polymer of component (2).

By "ionically-stabilised" is meant that the polymer has ionic internal dispersing groups built into its structure (preferably in pendant and/or terminal positions).

By "self-dispersible" is meant that the polymer forms a stable dispersion in water, as a consequence of its ionic stabilisation resulting from the internal dispersing groups, without the requirement for added (i.e. external) surfactant (s), although when forming an aqueous dispersion of such a polymer, external surfactant(s) may optionally still be employed if desired.

The internal ionic dispersing groups may be of the anionic or cationic type, but are more usually of the anionic type. Usually anionic dispersing groups are provided by carboxyl groups, which need to be in their neutralised form (carboxylate anionic groups) to effect their internal dispersing action. The required amount of dispersing groups could be achieved by neutralising only a certain proportion of the carboxyl groups or, alternatively, fully neutralising all such groups but having a lower amount of them in the polymer. The use of carboxyl groups providing dispersing groups has the additional benefit that it may also serve as non-radically-formed covalent bond-providing crosslinker groups when employing embodiment Q.

Sulphonate ion groups are also useful as anionic dispersing groups.

Nonionic dispersing groups (such as polyoxyethylene groups, PEO) may also be present in conjunction with the ionic dispersing groups (these are also preferably in pendant and/or terminal positions, but may also be in-chain).

As discussed above, the groups imparting radiation curability to the polymer of component (2) are olefinically unsaturated bonds. These are preferably located in chain-pendant and/or terminal positions, but could also possibly be in-chain. The olefinically unsaturated bond functionality is preferably at least 0.25 mmoles C=C/g polymer, and is more preferably in the range of from 0.5 to 3 mmoles C=C/g polymer.

The radiation-curable polymer of component (2) is preferably a polyurethane polymer. Polyurethane polymers are typically prepared from reactants which comprise an organic polyisocyanate component (usually a diisocyanate component although tri or higher functionality isocyanates can be employed) and a component comprising a compound(s) bearing NCO-reactive groups, particularly a macro or polymeric polyol (number average molecular weight $Mn \geq 500$), optionally with the inclusion of a low molecular weight polyol ($Mn \leq 499$). Monoisocyanates and monools may also be included in the synthesis.

The necessary olefinic unsaturation in the polyurethane (for radiation curability) could be introduced in a variety of ways. For example, a mono or poly (meth)acrylated mono or polyisocyanate could be employed in a urethane synthesis as part of the polyisocyanate component. More usually, (meth) acryloyl functional monol or polyol (usually an oligomeric or polymeric monool or polyol, and more usually a diol) could be employed as part of the polyol component—such compounds are available commercially, and may not need to be synthesised.

The necessary internal ionic dispersing groups for self dispersibility may be introduced by employing polyisocyanates or polyols bearing such groups in the urethane synthesis (or groups which may be subsequently converted to such groups), preferably the latter. In this regard it is particularly preferred to employ in the urethane synthesis dihydroxy functional alkanoic acid of formula

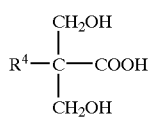

2 where $R^4$ is H or alkyl (usually 1–5C). More preferably the polyol is 2,2-dimethylol propionic acid (DMPA) or 2,2-dimethylol-n-butyric acid (DMBA).

Sulphonate anion dispersing groups for providing self dispersibility (also preferred) may be introduced by employing a sulphonate bearing polyester polyol in the urethane synthesis; typically an alkali metal salt of a sulphonic acid substituted aromatic dicarboxylic acid, such as sodio-5-sulphoisophthalic acid (SSIP), is used in the formation of the polyester polyol to provide the sulphonate functionality.

It is, further, preferred that a self-dispersible, ionically stabilised polyurethane polymer used as the polymer of component (2) is the chain-extended reaction product of an isocyanate-terminated urethane prepolymer and an active hydrogen chain-extending compound. Such a chain-extended polyurethane preferably has a Mw of at least 3000 g/mole (more preferably Mn of 3,000 to 500,000 g/mole, most preferably 4,000 to 250,000 g/mole).

More specifically, it is preferred that a self-dispersible, ionically-stabilised polyurethane polymer employed as the polymer of component (2) is a chain-extended product formed from reactants which comprise:

(A) an aqueous-dispersed isocyanate-terminated prepolymer formed from reactants which comprise:
  (i) at least one organic polyisocyanate;
  (ii) at least one isocyanate-reactive component comprising:
    (a) at least one polymeric polyol of Mn≧500 and having no internal dispersing groups and no olefinically unsaturated bonds;
    (b) at least one polyol bearing ionic internal dispersing groups or groups which may be converted to such groups;
    (c) at least one polyol bearing olefinically unsaturated bonds; and
(B) an active hydrogen chain-extending compound(s).

The organic polyisocyanate(s) A(i) used for making the prepolymer of the polyurethane is preferably an organic diisocyanate(s). Such organic polyisocyanate(s) may be an aliphatic (which term includes cycloaliphatic), araliphatic or aromatic polyisocyanate. Preferably, however, the polyisocyanate(s) is aliphatic.

Examples of suitable aliphatic polyisocyanates include ethylene diisocyanate, 1,6-hexamethylene diisocyanate, isophorone diisocyanate, cyclohexane-1,4-diisocyanate, 4,4'-dicyclohexylmethane diisocyanate, cyclopentylene diisocyanate, p-tetramethyl xylylene diisocyanate (p-TMXDI) and its meta isomer (m-TMXDI), hydrogenated 2,4-toluene diisocyanate, hydrogenated 2,6-toluene diisocyanate, and 1-isocyanato-1-methyl-3(4)-isocyanatomethyl-cyclohexane (IMCI). Polyisocyanate trimers, e.g. trimers of hexamethylene diisocyanate (isocyanurate, biuret type) can also be employed.

Suitable non-aliphatic polyisocyanates include p-xylylene diisocyanate, 1-4-phenylene diisocyanate, 2,4-toluene diisocyanate, 2,6-toluene diisocyanate, 4,4'-diphenylmethane diisocyanate, 2,4-diphenylmethane diisocyanate, and 1,5-naphthylene diisocyanate.

Mixtures of polyisocyanates can be used and also polyisocyanates which have been modified by the introduction or urethane, allophanate, urea, biuret, carbodiimide, uretonimine, uretidione or isocyanurate residues.

Preferred polyisocyanates are cycloaliphatic polyisocyanates such as 4,4'-dicyclohexylmethane diisocyanate and isophorone diisocyanate.

The polymeric polyol(s) A (ii)(a) of the isocyanate-reactive component A(ii) is preferably a polymeric diol, but may be or include polymeric polyol(s) of functionality more than 2. The polymeric polyol(s) preferably has a number average molecular weight (hereinafter Mn) within the range of from 500 to 8,000 g/mole, more preferably from 700 to 7,000 g/mole. Such polyol(s) is preferably essentially linear. Such polyol(s) in principle may be selected from any of the chemical classes of polymeric polyols used or proposed to be used in polyurethane synthesis. More preferably the polymeric polyol(s) is selected from a polyester polyol and a polyether polyol, and particularly preferably is a polyester polyol.

Polyols having Mn below 500 (which may be polymeric, or rather oligomeric, or monomeric) and having no internal dispersing groups and olefinically unsaturated bonds may optionally be used as part of the isocyanate-reactive component A(ii) in the preparation of the isocyanate-terminated prepolymer. Examples particularly include diols and (less preferably) triols or tetrols and mixtures thereof. Examples of such lower molecular weight polyols include ethylene glycol, 1,4-cyclohexane dimethanol and furan dimethanol, trimethylolpropane and glycerol.

It will be appreciated that the isocyanate-reactive component A(ii) may optionally include an isocyanate-reactive compound(s) which is other than a polyol (e.g. a diamine or an aminoalcohol); however the polyol component will normally be entirely or substantially comprised of polyol reactant(s).

The ionic dispersing groups of A(ii)(b) may be cationic, or more preferably, anionic, for example $-SO_3^-$, $-OSO_3^-$, $-CO_2^-$, $-PO_3^-$, and $-OPO_3^{331}$ and in particular carboxylate anion groups $-CO_2^-$ and sulphonate anion groups $-SO_3^-$.

Groups which are subsequently converted to dispersing groups are particularly unionised (or substantially unionised) acid or basic groups which can be e.g. converted to corresponding anionic or cationic groups by neutralisation or quaternisation. For example free (unionised) carboxylic acid groups can be neutralised to carboxylate anionic groups while tertiary amine groups can be quaternised to quaternary ammonium groups.

It is most preferred that ionic groups are incorporated into the prepolymer via anionic group-containing polyols or potentially anionic group-containing polyols which can be subsequently neutralised to form anionic groups using agents such as a tertiary amine, examples of which include triethylamine, triethanolamine or N-methylmorpholine, or an alkaline hydroxide such as K, Na or Li hydroxide or a quaternary ammonium hydroxide. Ammonia itself may also be used.

It is most preferred (as indicated above) that the reactants for introducing carboxylate anionic dispersing groups are dihydroxyalkanoic acids of formula 2, especially DMPA and DMBA.

The conversion of any acid groups present in the prepolymer to anionic salt groups may be effected by neutralising the acid groups before, after, or simultaneously with the formation of an aqueous dispersion of the prepolymer.

The component A(ii) may optionally include polyols bearing nonionic dispersing groups, typically polyethylene oxide groups (PEO groups) for introducing nonionic dispersing groups into the polyurethane.

Generally speaking, it is preferred to use within the range of from 0.1 to 1.1 (more preferably 0.2 to 0.75 and most preferably 0.25 to 0.6) milliequivalents of ionic (preferably anionic) internal dispersing groups per g of solid polyurethane prepolymer. In the case of optional nonionic internal dispersing groups (such as PEO chains), it is, generally speaking, preferred to use 0 to 25 weight % (more preferably 4 to 12 weight %) of such groups per g of solid polyurethane polymer. Optionally external nonionic surfactants (e.g. 0–5 weight %) could be employed to facilitate dispersing and stability.

The at least one polyol bearing olefinically unsaturated bonds is preferably a polyol bearing acryloyl or methacryloyl groups (as mentioned above). Preferably an unsaturated double bond functionality should be provided in the resulting polyurethane as a whole of at least 0.25 mmoles C=C/g polyurethane, more preferably 0.5 to 3 mmoles/g polyurethane.

The isocyanate-terminated polyurethane prepolymer may be prepared in conventional manner by reacting a stoichiometric excess of the organic polyisocyanate(s) with the isocyanate-reactive component (and any other reactants) under substantially anhydrous conditions at a temperature between about 30° C. and about 130° C. until reaction between the isocyanate groups and the isocyanate-reactive (usually all hydroxyl) groups is substantially complete. During the production of the isocyanate-terminated prepolymer the reactants are generally used in proportions corresponding to a ratio of isocyanate groups to isocyanate-reactive (usually all hydroxyl) groups from about 1.1:1 to about 6:1, preferably from about 1.5:1 to 3:1 (particularly 1.5:1 to 2:1). It is preferred to carry out the reaction to form the prepolymer in the presence of a small amount of a radical scavenger, such as 2,6-di-tert-butyl-4-methylphenol, to avoid any adverse effect on the olefinically unsaturated bonds (particularly when an elevated temperature is being used).

If desired, catalysts such as dibutyltin dilaurate or stannous octoate may be used to assist prepolymer formation. An organic solvent may optionally be added before, during or after prepolymer formation to control the viscosity preferably provided it does not vitiate the obtaining of a solvent-free final dispersion (such solvent may thus subsequently need to be removed as far as is possible). Suitable solvents which may be used are preferably water-miscible solvents such as N-methylpyrrolidone and methyl ethyl ketone.

The aqueous polyurethane dispersion can be formed according to a variety processes known to those skilled in the art. The aqueous polyurethane dispersion when formed using a prepolymer/chain extension synthesis is prepared by forming an aqueous dispersion of the isocyanate-terminated polyurethane prepolymer and dispersing it (optionally carried in an organic solvent medium) in an aqueous medium, utilising self-dispersibility properties of the prepolymer arising from internal dispersing groups in the isocyanate-terminated prepolymer, although free surfactant(s) may additionally be employed if desired, and chain extending the prepolymer with an active hydrogen compound(s) in the aqueous phase, the chain extender being present in the aqueous phase during dispersion or added subsequently (i.e. chain-extension can take place during and/or after the dispersion into water).

In another option (although less preferred) small amounts of reactive diluent can be used instead of solvents to reduce prepolymer viscosity during synthesis. Typically 2–6 weight % on total system and not more than 10 weight %, more preferred not more than 7 weight % on total system.

The prepolymer may be dispersed in water using techniques well known in the art. Preferably, the prepolymer is added to the water with agitation or, alternatively, water may be stirred into the prepolymer component.

The active hydrogen-containing chain extender compound(s) which may be reacted with the prepolymer component is suitably a primary or secondary aliphatic, alicyclic, aromatic, araliphatic or heterocyclic diamine or polyamine (i.e. having 3 or more amine groups as this term is conventionally understood, i.e. linked to C only), or hydrazine or a substituted hydrazine, or a polyhydrazide (preferably a dihydrazide).

Water-soluble chain extenders are preferred.

Water itself may be used as an indirect chain extender because it will slowly convert some of the terminal isocyanate groups of the prepolymer to amino groups (via unstable carbamic acid groups) and the modified prepolymer molecules will then undergo chain extension. However, this is very slow compared to chain extension using the above mentioned active hydrogen chain extenders (which can be called added chain extender compounds) which will provide the predominant chain extension reaction if used.

Examples of such added chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, toluene diamine, xylylene diamine, tri (2-aminoethyl) amine, 3,3-dinitrobenzidine, 4,4'-diaminodiphenylmethane, methane diamine, isophorone diamine, and adducts of diethylene triamine with acrylate or its hydrolysed products. Also materials such as hydrazine (e.g. in the form of its mono hydrate), azines such as acetone azine, substituted hydrazines such as, for example, dimethyl hydrazine, 1,6-hexamethylene-bis-hydrazine, carbodihydrazine, dihydrazides of dicarboxylic acids and sulphonic acids such as adipic acid dihydrazide, oxalic acid dihydrazide, isophthalic acid dihydrazide, hydrazides made by reacting lactones with hydrazine such as gamma-hydroxylbutyric hydrazide, bis-semi-carbazide, and bis-hydrazide carbonic esters of glycols.

Preferably the active hydrogen chain extender component is or includes hydrazine (usually in the form of its monohydrate), or a di or triamine (usually a diamine such as ethylene diamine or isophorone diamine) of Mn below 300.

When the chain extender is an added component, i.e. is other than modified prepolymer molecules formed by reaction with water, for example a polyamine or diamine or hydrazine, it may e.g. be added to the aqueous dispersion of prepolymer, or it may e.g. already be present in the aqueous medium when the prepolymer is dispersed therein, or it may e.g. simply be fed with prepolymer to water.

The chain extension can be conducted at elevated, reduced or ambient temperatures. Convenient temperatures are from about 5° C. to 90° C., more preferably 10° C. to 60° C.

The total amount of chain extender material(s) employed (other than water) is preferably such that the ratio of active hydrogens in the chain extender(s) to NCO groups in the prepolymer component is preferably within the range of from 0.7/1 to 2.0/1 more preferably 0.85/1 to 1.2/1. Of course, when water is employed as an indirect chain extender, these ratios will not be applicable since the water, functioning both as an indirect chain extender and a dispersing medium, will be present in a gross excess relative to the residual NCO groups.

It is evident from all the foregoing that the term "polyurethane" as used in this specification is intended to apply not only to polymers (or prepolymers) having only urethane linkages formed from isocyanate and hydroxyl groups, but also to polymers, prepolymers or polymer segments having, in addition to urethane linkages, linkages formed from isocyanate groups and groups such as $-NH_2$, $-NH-$, or $-SH$ groups.

The components (1) and (2) of the invention composition may be combined by any suitable method, although a simple blending procedure is favoured. Another possibility would be to form the radiation-curable polymer of component (2) in the presence of the acrylic polymers of component (1).

The weight ratio of the polymers of component (1) to the polymer of component (2) is preferably within the range of from 20/80 to 97/3, more preferably 45/55 to 90/10.

By Tg herein is meant the glass transition temperature, the Tg of a polymer, as is well known, being the temperature at which it changes from a rubbery or plastic state to a glassy or brittle state. It may be determined experimentally e.g. by differential scanning calorimetry, or calculated from the well known Fox equation, wherein the Tg, in degrees Kelvin, of a copolymer having "n" copolymerised comonomers is given by the weight fractions W of each comonomer type and the Tg's of the homopolymers (in degrees Kelvin) derived from each comonomer according to the equation:

$$\frac{1}{Tg} = \frac{W_1}{Tg_1} + \frac{W_2}{Tg_2} + \ldots \frac{W_n}{Tg_n}$$

The minimum film forming temperature (MFT) of an aqueous composition as used herein is the temperature where the composition forms a smooth and crackfree coating or film using DIN 53787 and applied using a Sheen MFFT bar SS3000.

Koenig hardness as used herein is a standard measure of hardness, being a determination of how the viscoelastic properties of a film formed from the dispersion slows down a swinging motion deforming the surface of the film, and is measured according to DIN 53157 NEN 5319 using an Erichsen hardness equipment.

The solids content of an aqueous composition of the invention is usually within the range of from about 20 to 65 wt % on a total weight basis, more usually 32 to 55 wt %. Solids content can, if desired, be adjusted by adding water or removing water (e.g. by distillation or ultrafiltration).

The aqueous composition of the invention may be used in various applications and for such purposes may be further optionally combined or formulated with other additives or components such as defoamers, rheology control agents, thickeners, dispersing and stabilising agents (usually surfactants), wetting agents, fillers, extenders, fungicides, bacteriocides, anti-freeze agents, waxes and pigments.

The aqueous dispersions may e.g. be used, appropriately formulated if necessary, for the provision of films, polishes, varnishes, lacquers, paints, inks and adhesives. However, they are particularly useful and suitable for providing the basis of protective coatings for wooden substrates (e.g. wooden floors), and plastics, paper, leather and metal substrates.

The dispersions (or compositions) once applied may be allowed to dry naturally at ambient temperature, or the drying process may be accelerated by heat (e.g. using an infrared source).

The present invention is now further illustrated but in no way limited by reference to the following examples. Unless otherwise specified all parts, percentages, and ratios are on a weight basis. The prefix C before an example number denotes that it is comparative. All Tg's were calculated using the Fox equation (unless specified otherwise).

Preparation of a Crosslinkable Aqueous Emulsion of an Acrylic Polymer Combination Containing External Crosslinking Agent (AP1)

A combination of hard and soft carbonyl functional acrylic polymers was prepared using a sequential polymerisation process as follows.

To a round-bottomed flask equipped with a condenser, thermometer and mechanical stirrer 910.8 parts of water, 1 part of sodium bicarbonate, and 3.1 parts of Surfagene FAZ109V (nonylphenol polyglycolether phosphate) were charged. This mixture was heated to 85° C. At 75° C., 5% of a monomer feed consisting of 216.9 parts of water, 362.8 parts of methyl methacrylate, 39.6 parts of diacetone acrylamide, 31.7 parts of methacrylic acid, 59.8 parts of ethyl acrylate, 9.3 parts of Surfagene FAZ109V, 0.5 parts of sodium bicarbonate, and 22.3 parts of lauryl mercaptane was added. At 80° C., 30% of an initiator feed consisting of 1.5 parts of ammonium persulphate and 97.5 parts of water was added. 5 minutes after the temperature reached 85° C. a start was made with the addition of the remainders of the monomer and initiator feeds. The monomer feed was added over a period of 60 minutes, while the initiator feed was added over a period of 70 minutes. At the end of the addition of the initiator feed 39.2 parts of water were used to rinse the feed tank and were added to the reactor. A temperature of 85° C. was maintained for 30 minutes after which the reaction mixture was cooled to 80° C. At 80° C. the resulting polymer emulsion was neutralised using 56.6 parts of a 25% solution of ammonia in water. The reaction mixture was subsequently kept at 80° C. for another 30 minutes before it was cooled to ambient temperature.

The resulting acrylic polymer emulsion had a solids content of 27.2% and a pH of 10.2. The Tg of this first formed acrylic polymer was 85° C.

To a round-bottomed flask equipped with a condenser, thermometer and mechanical stirrer 94.3 parts of water, 0.8 parts of ammonium persulphate and 183.1 parts of the aqueous emulsion of the hard acrylic polymer formed as above were added. 10% of a monomer feed consisting of 219.8 parts of water, 277.0 parts of n-butyl methacrylate, 85.4 parts of n-butyl acrylate, 11.2 parts of diacetone acrylamide, 274.7 parts of the aqueous emulsion of the hard acrylic polymer formed as above and 0.4 parts of dimethyl ethanol amine was added after which the temperature was raised to 85° C. At 85° C. the remainder of the monomer feed was added to the reactor over a period of 90 minutes. At the same time the monomer feed was started, an initiator feed consisting of 43.7 parts of water and 1.1 part of ammonium persulphate was started, which should take 100 minutes. After addition of the monomer feed to the reactor the feed tank was rinsed with 147.3 parts of water, which were subsequently added to the reactor. After the initiator feed was added, the temperature was kept at 85° C. for 30 minutes after which the reaction mixture was cooled to room temperature.

The Tg of the soft, second-formed acrylic polymer (formed in the presence of the first-formed hard acrylic) was 3° C.

To the resulting polymer aqueous emulsion was added a mixture of 10.7 parts of the external crosslinking agent adipic acid dihydrazide (ADH) and 20 parts of water. The final aqueous emulsion had a solids content of 37.4% and a pH of 9.2. The system is crosslinkable on coating forming according to embodiment X by reaction of the carbonyl groups with the hydrazide groups of the external crosslinking agent ADH.

Preparation of a Crosslinkable Aqueous Emulsion of an Acrylic Polymer Combination Containing External Crosslinking Agent (AP2)

A combination of hard and soft carbonyl functional acrylic polymers was prepared using a sequential polymerisation process as follows.

To a round-bottomed flask equipped with a condenser, thermometer and mechanical stirrer 0.8 parts of ammonium persulphate and 533.3 parts of the aqueous emulsion of the hard acrylic polymer formed as above in AP1 were added. 10% of a monomer feed consisting of 213.4 parts of water, 268.9 parts of n-butyl methacrylate, 82.9 parts of n-butyl acrylate, 10.9 parts of diacetone acrylamide, 800.0 parts of the hard acrylic polymer emulsion and 0.4 parts of dimethyl ethanol amine was added after which the temperature was raised to 85° C. At 85° C. the remainder of the monomer feed was added to the reactor over a period of 90 minutes. At the same time as the monomer feed was started, an initiator feed consisting of 42.4 parts of water and 1.1 part of ammonium persulphate was started, which should take 100 minutes. After the initiator feed was added the temperature was kept at 85° C. for 30 minutes after which the reaction mixture was cooled to ambient temperature. The Tg of the soft, second-formed acrylic polymer (formed in the presence of the first-formed hard acrylic polymer formed as above in AP1 was 3° C.

To resulting aqueous polymer emulsion was added a mixture of 19.8 parts of the external crosslinking agent adipic acid dihydrazide and 11.6 parts of water. The final aqueous emulsion had a solids content of 37.4% and a pH of 9.8. The system is crosslinkable according to embodiment X on coating formation by reaction of the carbonyl groups with the hydrazide groups of the external crosslinking agent ADH.

Preparation of an aqueous dispersion of a Radiation Curable Polymer (R1)

A self-dispersible uv-curable polyurethane polymer in accordance with component (2) of the invention composition was prepared as follows.

To a round-bottomed flask equipped with a thermometer and mechanical stirrer, 330.7 parts of isophorone diisocyanate, 37.5 parts of dimethylol propionic acid, 52.5 parts of an acryloyl functional polyol CN104 (OH number= 233.9 mg KOH/g; Cray Valley, France), 329.3 parts of a polyester diol S-1063-120 (OH number=120 mg KOH/g; Occidental Chemical, Belgium), 0.15 parts of 2,6-di-tert-butyl-4-methylphenol (Ionol CP) and 0.15 parts of tin octoate were added and slowly heated to 95° C. under a dry air atmosphere. The mixture was held at this temperature until the NCO content was 8.04%. Subsequently 28.3 parts of triethylamine were added to the reaction mixture. 500 parts of this mixture were dispersed into 905 parts water during 1 hour to form an aqueous dispersion of the NCO-terminated prepolymer. Thereafter 22.9 parts of hydrazine were added as a 64.5% solution in water to chain-extend the prepolymer. The resulting translucent polyurethane dispersion had a solids content of 34.6% and a pH of 8.0. The unsaturated bond functionality was 0.57 mmoles C=C/g polymer.

Preparation of an Aqueous Emulsion of a Radiation-Curable Oligomer (R2)

A uv-curable urethane oligomer not in accordance with component (2) of the invention composition (by virtue of not being self-dispersible) and for use in comparative examples (see following Examples C2 and C5), was prepared as follows.

To a round-bottomed flask equipped with a thermometer, dropping funnel and mechanical stirrer 461.3 parts of tetramethyl-m-xylylene diisocyanate, 0.45 parts of 2,6-di-tert.-butyl-4-methylphenol (Ionol CP) and 0.2 parts of tin octoate were added and slowly heated to 90° C. 438.6 parts of hydroxyethyl acrylate were added dropwise to this mixture during 60 minutes. This mixture was held at 95° C. until the NCO content was below 0.2%. The resulting acryloyl functional urethane oligomer was a slightly yellow viscous liquid. Because this urethane is not self-dispersing it was emulsified according to the following recipe.

| Composition | Supplier | RO1 |
| --- | --- | --- |
| Viscous liquid urethane | — | 75.0 |
| Triton X100 | Union Carbide | 2.5 |
| Water | — | 22.5 |

NB This emulsion was prepared at 80° C., adding to a vessel the viscous liquid urethane and Triton X100 (alkylphenol ethoxylate), and then with vigorous mixing using a Dispersmat stirrer, slowly adding water during 15 minutes to give a stable and creamy emulsion.

Preparation of an Aqueous Emulsion of a Radiation Curable Monomer (R3)

The intention here was to prepare an aqueous emulsion of a uv-curable monomer, trimethylol propane tri-acrylate (TMPTA) (i.e. not in accordance with component (2)) for use in comparative examples (see following Examples C3 and C6).

TMPTA is not self-dispersible and so was emulsified in water using the following ingredients.

| Compound | Supplier | emulsified TMPTA (parts) |
| --- | --- | --- |
| TMPTA | BASF | 75.0 |
| Triton X100 | Union Carbide | 2.5 |
| Water | — | 22.5 |

The emulsion was prepared at room temperature, adding to a vessel the TMPTA and Triton X100, and then vigorously mixing using a Dispermat stirrer, slowly adding water during 20 minutes to give a creamy and stable emulsion.

EXAMPLES 1, C2, C3, 4, C5 AND C6

Aqueous polymer compositions were prepared by mixing the acrylic polymer emulsions AP1 and AP2 with the emulsions of the uv-curable R1, R2, and R3, as shown in the following Table 1. Examples 1 and 4 are according to the invention (the acrylic polymer system crosslinkability being by embodiment X), while Examples C2, C3, C5 and C6 are comparative examples for the reasons explained above. In each composition the ratio of the acrylic polymer component (i.e. including both acrylic polymers) to the uv-curable compound was 70/30 (solids:solids).

3 parts of the photoinitiator Darocure 1173 (Ciba Geigy) were added per 100 parts of each dispersion and films were subsequently cast with a wire rod on test charts to a wet-film thickness of 125 micrometers and also cast with a film applicator to a thickness of 80 micrometers on glass plates. Drying was carried out rapidly at 60° C. and the coated test charts and glass plates were passed twice under a high pressure mercury lamp (120 watts/cm, wave length 240 nm) at 10 m/minutes. This effected uv-curing, with covalent crosslinking also having taken place at ambient temperature after drying by reaction of the carbonyl groups on the acrylic polymers and the hydrazide groups on the ADH crosslinking agent.

The dispersion stability of a sample of each composition was monitored at 52° C. as an accelerated stability test and any gel formation or phase separation of the dispersion was assessed as corresponding to an unstable dispersion. (The figures>1 week for Example 1 and 4 indicate that the dispersion was still stable after 1 week); the term "unstable" for Examples C2, C3, C5 and C6 means that the dispersions rapidly became unstable at 52° C.).

The hardness of the cured films was measured on the glass plates using a Pendulum Hardness Tester according to the Koenig test method.

Xylene rub tests (being a measure of the resistance of the coating to xylene solvent) were performed on the coated glass plates using cotton wool soaked with xylene which was rubbed over the surface of the coating, the number of rubs before failure being listed.

Resistance to blocking was carried out using "early blocking" and "normal blocking" tests with a block tester both before uv application and after uv application with films coated on paper test charts and rapidly dried at 60° C. In the normal blocking test the films were aged for 16 hours at 52° C. in an oven. Next, pairs of the coated test charts were placed with the film coatings face to face and left at 52° C. for 4 hours with a pressure of 1 kg/cm². In the early blocking test, the films were aged at 60° C. for 20 minutes after which the face to face pairs of coated test charts were pressed for 4 hours with a pressure of 3 kg/cm². After cooling to ambient temperature in each test, the test charts were peeled and the degree of block resistance assessed, ranging from 0 (very poor blocking resistance) to 5 (excellent blocking resistance).

The results of the above testing are shown in the following Table 1. It is apparent that the use of non-self-dispersible radiation curable components in the compositions not only resulted in inferior dispersion stability but also (for the most part) in inferior hardness, xylene resistance and blocking resistance.

To a round-bottomed flask equipped with a condenser, thermometer and mechanical stirrer, 0.8 parts of ammonium persulphate, and 549.4 parts of the aqueous emulsion of the hard acrylic polymer formed as above were added. 10% of a monomer feed consisting of 209.8 parts of water, 293.3 parts of n-butyl methacrylate, 80.3 parts of n-butyl acrylate, 824.1 parts of the aqueous emulsion of the hard acrylic polymer formed as above and 0.4 parts of dimethyl ethanol amine was added after which the temperature was raised to 85° C. At 85° C., the remainder of the monomer feed was added to the reactor over a period of 90 minutes. At the same time as the monomer feed was started, a catalyst feed consisting of 43.7 parts of water and 1.1 part of ammonium persulphate was started, which should take 100 minutes. After the catalyst feed had been added the temperature was kept at 85° C. for 30 minutes after which the reaction mixture was cooled to room temperature. The Tg of the soft, second formed acrylic polymer (formed in the presence of the first-formed hard acrylic) was 0° C.

The resulting acrylic polymer emulsion had a solids content of 37.4% and a pH of 9.2. The system is not crosslinkable on coating formation according to embodi-

TABLE 1

| Ex. No | Acrylic Component emulsion | uv-curable compound dispersion | Embodiment of Invention | 52° C. stability | Hardness (sec) | Xylene rubs | Early Blocking Before uv cure | Early Blocking After uv cure | Normal Blocking Before uv cure | Normal Blocking After uv cure |
|---|---|---|---|---|---|---|---|---|---|---|
| 1 | AP1 | R1 | X | >1 week | 64 | 38 | 2 | 3 | 4 | 4–5 |
| C2 | AP1 | R2 | — | unstable | 52 | 28 | 0 | 0 | 0 | 0 |
| C3 | AP1 | R3 | — | unstable | tacky | 20 | 0 | 0 | 0 | 0 |
| 4 | AP2 | R1 | X | >1 week | 108 | 67 | 0 | 0–1 | 4–5 | 4 |
| C5 | AP2 | R2 | — | unstable | 162 | >100 | 0 | 0 | 0 | 0 |
| C6 | AP2 | R3 | — | unstable | 78 | 52 | 0 | 0 | 0 | 0 |

Preparation of a Non-crosslinkable Aqueous Emulsion of an Acrylic Polymer Combination Containing no External Crosslinking Agent (AP3)

A combination of hard and soft acrylic polymers, the hard acrylic polymer being carboxyl functional, was prepared using a sequential polymerisation process as follows.

To a round-bottomed flask equipped with a condenser, thermometer and mechanical stirrer 910.8 parts of water, 1 part of sodium bicarbonate, and 3.1 parts of Surfagene FAZ109V were charged. This mixture was heated to 85° C. At 75° C., 5% of a monomer feed consisting of 216.9 parts of water, 393.4 parts of methyl methacrylate, 32.7 parts of methacrylic acid, 68.8 parts of ethyl acrylate, 9.3 parts of Surfagene FAZ109V, 0.5 parts of sodium bicarbonate, and 22.3 parts of lauryl mercaptane was added. At 80° C., 30% of a catalyst feed consisting of 1.5 parts of ammonium persulphate and 97.5 parts of water was added. 5 minutes after the temperature reached 85° C. a start was made with the addition of the remainders of the monomer and catalyst feeds. The monomer feed was added over a period of 60 minutes, while the catalyst feed was added over a period of 70 minutes. At the end of the addition of the catalyst feed 39.2 parts of water were used to rinse the feed tank and were added to the reactor. A temperature of 85° C. was maintained for 30 minutes after which the reaction mixture was cooled to 80° C. At 80° C. the emulsion was neutralised using a mixture of 56.6 parts of a 25% solution of ammonia in water and 56.6 parts of water. The reaction mixture was subsequently kept at 80° C. for another 30 minutes before it was cooled to room temperature.

The resulting acrylic polymer emulsion had a solids content of 27.2% and a pH of 10.2. The Tg of this first formed hard acrylic polymer was 85° C.

ment X by virtue of not containing an external crosslinking agent having groups which can react with the carboxyl groups in the acrylic polymer combination (the only potential crosslinker groups therein).

Preparation of a Crosslinkable Aqueous Emulsion of an Acrylic Polymer Combination Containing an External Crosslinking Agent (AP4)

A combination of hard and soft carbonyl functional acrylic polymers was prepared using a sequential polymerisation process as follows.

To a round-bottomed flask equipped with a condenser, thermometer and mechanical stirrer 910.8 parts of water, 1 part of sodium bicarbonate, and 3.1 parts of Surfagene FAZ109V were charged. This mixture was heated to 85° C. At 75° C., 5% of a monomer feed consisting of 216.9 parts of water, 362.8 parts of methyl methacrylate, 39.6 parts of diacetone acrylamide, 32.7 parts of methacrylic acid, 59.8 parts of ethyl acrylate, 9.3 parts of Surfagene FAZ109V, 0.5 parts of sodium bicarbonate, and 22.3 parts of lauryl mercaptane was added. At 80° C., 30% of a catalyst feed consisting of 1.5 parts of ammonium persulphate and 97.5 parts of water was added. 5 minutes after the temperature had reached 85° C., a start was made with the addition of the remainders of the monomer and catalyst feeds. The monomer feed was added over a period of 60 minutes, while the catalyst feed was added over a period of 70 minutes. At the end of the addition of the catalyst feed 39.2 parts of water were used to rinse the feed tank and were added to the reactor. A temperature of 85° C. was maintained for 30 minutes after which the reaction mixture was cooled to 80° C. At 80° C. the emulsion was neutralised using a mixture of 56.6 parts of a 25% solution of ammonia in water and 56.6 parts of water. The reaction mixture was subsequently kept at 80° C. for another 30 minutes before it was cooled to room temperature. The resulting acrylic polymer emulsion had a solids content of 27.2%. The Tg of this first formed hard acrylic polymer was 85° C.

To a round-bottomed flask equipped with a condenser, thermometer and mechanical stirrer, 0.7 parts of ammonium persulphate, and 533.3 parts of the aqueous emulsion of the hard acrylic polymer formed as above were added. 10% of a monomer feed consisting of 213.4 parts of water, 351.8 parts of n-butyl methacrylate, 10.9 parts of diacetone acrylamide, 800.0 parts of the aqueous emulsion of the hard acrylic polymer formed as above and 0.4 parts of dimethyl ethanol amine was added after which the temperature was raised to 85° C. At 85° C., the remainder of the monomer feed was added to the reactor over a period of 90 minutes. At the same time as the monomer feed was started, a catalyst feed consisting of 42.4 parts of water and 1.1 part of ammonium persulphate was started, which should take 100 minutes. After the catalyst feed had been added the temperature was kept at 85° C. for 30 minutes after which the reaction mixture was cooled to room temperature.

At room temperature a solution of 19.8 parts of adipic dihydrazide and 11.6 parts of water was added. The Tg of the soft, second formed acrylic polymer (formed in the presence of the first formed hard acrylic polymer) was 21° C. The final aqueous emulsion had a solids content of 37.8%. The system is crosslinkable on coating formation according to embodiment X by reaction of the carbonyl groups with the hydrazide groups of the external crosslinking agent ADH.

Preparation of a Crosslinkable Aqueous Emulsion of an Acrylic Polymer Combination Containing an External Crosslinking Agent (AP5)

A combination of hard and soft carbonyl functional polymers was prepared using a sequential polymerisation process as follows.

To a round-bottomed flask equipped with a condenser, thermometer and mechanical stirrer, 993.3 parts of water and 8.3 parts of Surfagene FAZ109V were charged. This mixture was heated to 85° C. At 50° C., 10% of a monomer feed consisting of 110.9 parts of water, 270.5 parts of methyl methacrylate, 29.5 parts of diacetone acrylamide, 24.4 parts of methacrylic acid, 44.6 parts of ethyl acrylate and 24.9 parts of Surfagene FAZ109V was added. At 75° C., 30% of a catalyst feed consisting of 1.6 parts of ammonium persulphate and 30.1 parts of water was added. As soon as the reaction temperature had been reached the remainders of the monomer feed and catalyst feed were added over a period of 60 minutes. At the end of the monomer feed the feed tank was rinsed with 10.9 parts of water, which was subsequently added to the reactor. The polymerisation mixture was kept at 85° C. for 60 minutes before starting the second monomer and catalyst feeds. These consisted of 1.2 parts of water, 273.6 parts of n-butyl methacrylate, 84.4 parts of n-butyl acrylate and 11.1 parts of diacetone acrylamide for the monomer feed and 1.6 parts of ammonium persulphate and 30.1 parts of water for the catalyst feed, respectively. Next the mixture was kept at polymerisation temperature for 30 minutes. Free monomer was further reduced by adding a mixture of 0.7 parts of iso-ascorbic acid and 14.0 parts of water followed by a mixture of 0.9 parts of an 80 weight-% solution of t-butyl hydroperoxide in water and 1.5 parts of water. Temperature was maintained at 85° C. for another 30 minutes before 15.4 parts of a 12.5 weight-% solution of ammonia in water and 20.6 parts of adipic dihydrazide were added. The resulting emulsion had a solids content of 37.5%. The Tg of the first formed hard acrylic polymer was 85° C., and that of the second formed soft acrylic polymer was 0° C. The system is crosslinkable according to embodiment X on coating formation by reaction of the carbonyl groups with the hydrazide groups of the external crosslinking agent ADH.

Preparation of a Crosslinkable Aqueous Emulsion of an Acrylic Polymer Combination Containing no External Crosslinking Agent (AP6)

A combination of a hard acrylic polymer bearing amino groups and a soft acrylic polymer bearing carbonyl groups was prepared using a sequential polymerisation process as follows.

To a round-bottomed flask equipped with a condenser, thermometer and mechanical stirrer, 910.8 parts of water, 1 part of sodium bicarbonate, and 3.1 parts of Surfagene FAZ109V were charged. This mixture was heated to 85° C. At 75° C., 5% of a monomer feed consisting of 216.9 parts of water, 393.4 parts of methyl methacrylate, 32.7 parts of methacrylic acid, 68.8 parts of ethyl acrylate, 9.3 parts of Surfagene FAZ109V, 0.5 parts of sodium bicarbonate, and 22.3 parts of lauryl mercaptane was added. At 80° C., 30% of a catalyst feed consisting of 1.5 parts of ammonium persulphate and 97.5 parts of water was added. 5 minutes after the temperature had reached 85° C., a start was made with the addition of the remainders of the monomer and catalyst feeds. The monomer feed was added over a period of 60 minutes, while the catalyst feed was added over a period of 70 minutes. At the end of the addition of the catalyst feed, 39.2 parts of water were used to rinse the feed tank and were added to the reactor. A temperature of 85° C. was maintained for 30 minutes after which the reaction mixture was cooled to 80° C. At 80° C. the emulsion was neutralised using a mixture of 56.6 parts of a 25% solution of ammonia in water and 56.6 parts of water. The reaction mixture was subsequently kept at 80° C. for another 30 minutes before it was cooled to room temperature. The resulting acrylic polymer emulsion had a solids content of 27.2% and a pH of 10.2. The Tg of this first formed hard acrylic polymer was 85° C.

To a round-bottomed flask equipped with a condenser, thermometer and mechanical stirrer, 0.7 parts of ammonium persulphate, and 533.3 parts of the aqueous emulsion of the hard acrylic polymer formed as above were added. 10% of a monomer feed consisting of 213.4 parts of water, 274.1 parts of n-butyl methacrylate, 77.7 parts of n-butyl acrylate, 10.9 parts of acetoacetoxy ethylmethacrylate, 824.1 parts of the aqueous emulsion of the hard acrylic polymer formed as above and 0.4 parts of dimethyl ethanol amine was added, after which the temperature was raised to 85° C. At 85° C., the remainder of the monomer feed was added to the reactor over a period of 90 minutes. At the same time as the monomer feed was started, a catalyst feed consisting of 43.7 parts of water and 1.1 part of ammonium persulphate was started, which should take 100 minutes. After the catalyst feed was added the temperature was kept at 85° C. for 30 minutes after which the reaction mixture was cooled to 55° C. At 55° C., 32.3 parts of a 1:2 mixture by weight of propylene imine and water was added over a period of 45 minutes to iminate carboxyl groups on the first formed acrylic polymer to form pendant amine groups. At the end of the feed the mixture was cooled and stirred at room temperature for 16 hours. The Tg of the soft, second formed acrylic polymer was 0° C. The resulting aqueous polymer emulsion had a solids content of 37.1%. The system is crosslinkable on coating formation according to one or (most likely) both of embodiments Y and Z. Via embodiment Y, the crosslinking proceeds by reaction of the amino groups on the first formed acrylic polymer with the carbonyl groups on the second formed acrylic polymer. Via embodiment Z, the crosslinking proceeds by reaction of the amino groups on the first formed acrylic polymer with the unsaturated bonds of a subsequently added radiation curable polymer according to component (2) (see later) (Michael addition).

Preparation of a Crosslinkable Aqueous Emulsion of an Acrylic Polymer Combination Containing no External Crosslinking Agent (AP7)

A combination of hard acrylic polymer bearing amino and carbonyl groups and a soft acrylic polymer bearing carbonyl groups was prepared using a sequential polymerisation process as follows.

To a round-bottomed flask equipped with a condenser, thermometer and mechanical stirrer, 993.3 parts of water and 8.3 parts of Surfagene FAZ109V were charged. This mixture was heated to 85° C. At 50° C., 10% of a monomer feed consisting of 110.9 parts of water, 270.5 parts of methyl methacrylate, 29.5 parts of diacetone acrylamide, 24.4 parts of methacrylic acid, 44.6 parts of ethyl acrylate and 24.9 parts of Surfagene FAZ109V was added. At 75° C., 30% of a catalyst feed consisting of 1.6 parts of ammonium persulphate and 30.1 parts of water was added. As soon as the reaction temperature had been reached the remainders of the monomer feed and catalyst feed were added over a period of 60 minutes. At the end of the monomer feed the feed tank was rinsed with 10.9 parts of water, which was subsequently added to the reactor. The polymerisation mixture was kept at 85° C. for 60 minutes before starting the second monomer and catalyst feeds. These consisted of 1.2 parts of water, 273.6 parts of n-butyl methacrylate, 84.4 parts of n-butyl acrylate and 11.1 parts of diacetone acrylamide for the monomer feed and 1.6 parts of ammonium persulphate and 30.1 parts of water for the catalyst feed, respectively. Next the mixture was kept at polymerisation temperature for 30 minutes. Free monomer was further reduced by adding a mixture of 0.7 parts of iso-ascorbic acid and 14.0 parts of water followed by a mixture of 0.9 parts of an 80 weight-% solution of t-butyl hydroperoxide in water and 1.5 parts of water. The mixture was cooled to 55° C. after which 33.7 parts of a 1:2 mixture of propylene imine and water was added to the reactor over a period of 45 minutes to iminate carboxyl groups on the first formed acrylic polymer to form pendant amino groups. At the end of the feed the mixture was cooled and stirred at room temperature for 16 hours. The resulting emulsion had a solids content of 37.8% and a pH of 9.2. The Tg of the first formed acrylic polymer was 85° C., that of the second formed acrylic polymer was 0° C. The system is crosslinkable on coating formation according to one or (most likely) both of embodiment Y and Z. Via embodiment Y, the crosslinking proceeds by reaction of the amino groups on the first formed acrylic polymer with carbonyl groups on the first and second formed acrylic polymer. Via embodiment Z, the crosslinking proceeds by reaction of the amino groups on the first formed acrylic polymer with the unsaturated bonds of a subsequently added radiation curable polymer according to component (2) (see later) (Michael addition).

Preparation of a Crosslinkable Aqueous Emulsion of an Acrylic Polymer Combination Containing no External Crosslinking Agent (AP8)

A combination of a hard acrylic polymer bearing amino groups and a soft acrylic polymer was prepared as follows.

To a round-bottomed flask equipped with a condenser, thermometer and mechanical stirrer, 0.8 parts of ammonium persulphate, and 549.4 parts of the aqueous emulsion of the first formed hard acrylic polymer as per AP3 above were added. 10% of a monomer feed consisting of 209.8 parts of water, 293.3 parts of n-butyl methacrylate, 80.3 parts of n-butyl acrylate, 824.1 parts of the aqueous emulsion of the first formed hard acrylic polymer from AP3 and 0.4 parts of dimethyl ethanol amine was added, after which the temperature was raised to 85° C. At 85° C., the remainder of the monomer feed was added to the reactor over a period of 90 minutes. At the same time as the monomer feed was started, a catalyst feed consisting of 43.7 parts of water and 1.1 part of ammonium persulphate was started, which should take 100 minutes. After the catalyst feed had been added the temperature was kept at 85° C. for 30 minutes after which the reaction mixture was cooled to 55° C. At 55° C., 32.3 parts of a 1:2 mixture by weight of propylene imine and water was added over a period of 45 minutes to iminate carboxyl groups on the first formed polymer to form pendant amino groups. At the end of the feed the mixture was cooled and stirred at room temperature for 16 hours. The Tg of the second formed acrylic polymer was 0° C. The resulting polymer emulsion had a solids content of 37.4% and a pH of 9.2. The system is crosslinkable on coating formation according to embodiment Z, the amino groups on the first formed acrylic polymer reacting with the unsaturated bonds of a subsequently added radiation curable polymer according to component (2) (see later) (Michael addition).

Preparation of a Crosslinkable Aqueous Emulsion of an Acrylic Polymer Combination Containing an External Crosslinking Agent (AP9)

A combination of a hard acrylic polymer bearing carboxyl groups and a soft acrylic polymer was prepared as follows.

To a round-bottomed flask equipped with a condenser, thermometer and mechanical stirrer, 0.8 parts of ammonium persulphate, and 549.4 parts of the aqueous emulsion of the first formed hard acrylic polymer as per AP3 above were added. 10% of a monomer feed consisting of 209.8 parts of water, 293.3 parts of n-butyl methacrylate, 80.3 parts of n-butyl acrylate, 824.1 parts of the aqueous emulsion of the first formed hard acrylic polymer of AP3 and 0.4 parts of dimethyl ethanol amine was added, after which the temperature was raised to 85° C. At 85° C., the remainder of the monomer feed was added to the reactor over a period of 90 minutes. At the same time as the monomer feed was started, a catalyst feed consisting of 43.7 parts of water and 1.1 part of ammonium persulphate was started, which should take 100 minutes. After the catalyst feed had been added the temperature was kept at 85° C. for 30 minutes after which the reaction mixture was cooled to 40° C. At 40° C. a mixture of 7.0 parts of water, 3.3 parts of zinc oxide, 4.2 parts of ammonium carbonate and 6.0 parts of a 25% solution of ammonia in water was added over a period of 100 minutes. Next 1.7 parts of Akyporox 111/400V (non ionic surfactant) was added followed by 1.6 parts of water and the mixture was cooled to room temperature. The Tg of the second formed acrylic polymer was 0° C. The resulting emulsion had a solids content of 37.4% and a pH of 10. The system is crosslinkable on coating formation according to embodiment X by virtue of coordinate covalent bond formation resulting from the donation of electron pairs on oxygen atoms of the carboxyl groups of the first formed acrylic polymer to acceptor shells of the Zn cations in the zinc oxide (acting as an external crosslinking agent).

Preparation of an Aqueous Dispersion of a Radiation-Curable Polymer (R4)

A self-dispersible uv curable linear sulphonate stabilised polyurethane polymer in accordance with component (2) of the invention composition was prepared as follows.

To a round-bottomed flask equipped with a thermometer and mechanical stirrer, 228.3 parts of isophorone diisocyanate, 0.7 parts of 2,6-di-tert-butyl-4-methylphenol (Ionol CP) and 0.2 parts of tin octoate were added and the mixture was heated to 95° C. under a dry air atmosphere. Then 32.8 parts of 2-hydroxyethyl acrylate was added slowly over a period of 1 hour while the temperature was kept at 95° C. After the complete addition of 2-hydroxyethyl acrylate, the temperature of the reaction mixture was kept at 95° C. for an additional hour. After cooling to 50° C., 45.9 parts of methoxypolyethylene glycol (Mw=750; BASF, Germany), 349.2 parts of a sulphonate-functional polyester diol S-1132-110 (OH number=110 mg KOH/g; Occidental Chemical, Belgium), 93.8 parts of ethoxylated trimethylolpropane triacrylate (Sartomer SR-454, Sartomer, USA), 0.7 parts of 2,6-di-tert-butyl-4-methylphenol (Ionol CP) and 0.1 parts of tin octoate were added and the mixture was slowly heated to 95° C. The mixture was held at this temperature until the NCO content was 5.12%. 500 parts of this mixture were dispersed into 941 parts of water during 1 hour to form an aqueous dispersion of the NCO-terminated prepolymer. Thereafter 14.4 parts of hydrazine were added as a 64.5% solution in water to chain-extend the prepolymer. The resulting translucent polyurethane dispersion had a solids content of 35% and a pH of 8.0. The unsaturated bond functionality was 1.25 mmoles C=C/g polymer.

EXAMPLES C7, 8, 9, 10, 11, 12 AND 13

Aqueous polymer compositions were prepared by slowly adding the uv-curable urethane dispersion R4 to the acrylic polymer emulsions AP3, AP4, AP5, AP6, AP7, AP8 and AP9 (all solid to solid weight ratio's of 3:1, acrylic:urethane) as shown in the following Table 2. Examples 8 through 13 are according to the invention while Example C7 is comparative (the acrylic polymer combination of AP3 having no external crosslinking agent for crosslinking the carboxyl groups thereof).

To the blends were added 3% by weight on solids content of a UV initiator (KIP 100F ex. Lamberti) and the mixtures were allowed to stand for 16 hours before application. Films were subsequently cast with a wire rod on test charts to a wet-film thickness of 125 micrometers and also cast with a film applicator to a thickness of 80 micrometers on glass plates. Drying was carried out rapidly at 60° C. and the coated test charts and glass plates were passed twice under a high pressure mercury lamp (120 watts/cm, wave length 240 nm) at 10 m/minutes. This effected UV curing, with covalent crosslinking also having taken place at ambient temperature after drying (except in Example C7) by reaction of crosslinker groups on the acrylic polymer(s) and with an added crosslinker agent (embodiment X) or with other groups also on acrylic polymer(s) (embodiment Y) or with unsaturated groups on the radiation curable R4 (embodiment Z).

Xylene rub tests (being a measure of the resistance of the coating to xylene solvent) were performed (both before uv application and after uv application) on the coated glass plates using cotton wool soaked with xylene which was rubbed over the surface of the coating, the number of rubs before failure being listed.

Resistance to blocking (normal blocking only and after uv cure only) was carried out as described in Examples 1 to C6

The results of the above testing are shown in Table 2.

EXAMPLE 14

An aqueous composition according to the invention was prepared by first blending the acrylic polymer emulsion AP3 with the UV curable sulphonate-stabilised urethane dispersion R4 (3:1 solids to solids weight ratio acrylic:urethane) and formulated as described above. Next, to 100 parts of the formulated blend were added 0.7 parts of the aziridine-functional external crosslinking agent Crosslinker CX-100 (ex. NeoResins) which is able to react with carboxylic acid groups on the acrylic polymer backbone (but not with the sulphonate groups on the polyurethane) and thus induce covalent crosslinking (embodiment X). Films were cast after addition of CX-100 and evaluated as described above (in Examples C7, 8 to 13). The results are shown in Table 2.

EXAMPLE 15

An aqueous composition according to the invention was prepared by first blending the acrylic polymer emulsion AP3 with the UV curable urethane dispersion R1 containing carboxylic acid groups (for stabilisation) (3:1 solids to solids weight ratio acrylic:urethane) and formulated as described above. Next, to 100 parts of the formulated blend were added 0.7 parts of Crosslinker CX-100™ (ex. NeoResins) which is able to react with carboxylic acid groups on both the acrylic polymer backbone and the urethane polymer, thus inducing covalent crosslinking without affecting the unsaturated double bonds of the polyurethane (embodiment Q). Films were cast after addition of Crosslinker CX-100™ and evaluated as described above (in Examples C7, 8 to 13), the results being shown in Table 2.

TABLE 2

| Ex. No. | Acrylic Component Emulsion | UV-curable polyurethane dispersion | Embodiment of Invention | Xylene rubs before uv cure | Xylene rubs after uv cure | Normal Blocking after uv cure |
|---|---|---|---|---|---|---|
| C7 | AP3 | R4 | — | 14 | 30 | 3 |
| 8 | AP4 | R4 | X | 76 | >100 | 4 |
| 9 | AP5 | R4 | X | 50 | >100 | 5 |
| 10 | AP6 | R4 | Y & Z | 52 | 64 | 4 |
| 11 | AP7 | R4 | Y & Z | 10 | >100 | 4–5 |
| 12 | AP8 | R4 | Z | 28 | 64 | 4 |
| 13 | AP9 | R4 | X | 20 | 60 | 4–5 |
| 14 | AP3* | R4 | X | 24 | 40 | 4–5 |
| 15 | AP3* | R1 | Q | 40 | 66 | 4–5 |

*plus post added aziridine functional crosslinking agent.

EXAMPLES 16 AND 17

These examples are repeats of Example 8 (which uses embodiment X) except that the weight ratios of acrylic:urethane (solids:solids) are changed from 3:1 (in Example 8) to 9:1 (Example 16) and 1:1 (Example 17). Formulation and application went identical to the examples of C7, 8 to 15. The results (including those for Example 8) are shown in the following Table 3.

TABLE 3

| Ex. No. | Acrylic Component emulsion | UV polyurethane dispersion | Ratio acrylic:polyurethane | Xylene rubs before uv cure | Xylene rubs after uv cure | Normal Blocking after uv cure |
|---|---|---|---|---|---|---|
| 16 | AP4 | R4 | 9:1 | 32 | 52 | 2 |
| 8 | AP4 | R4 | 3:1 | 76 | >100 | 4 |
| 17 | AP4 | R4 | 1:1 | 14 | >100 | 4 |

Preparation of an Aqueous Dispersion of a Non-UV Curable Polymer (NR1)

The intention here was to prepare a self-dispersible non-uv curable polymer (i.e. not in accordance with component (2) of the invention) in order to prepare a blend of it with the acrylic emulsion AP4 (see Example C18 following) and to compare this with Example 8 (blend of AP4 with the uv-curable polyurethane R4).

A self-dispersible non-uv curable linear carboxylate anion stabilised polyurethane polymer, was prepared as follows.

To a round-bottomed flask equipped with a thermometer and mechanical stirrer, 304.7 parts of isophorone diisocyanate, 40.0 parts of dimethylol propionic acid (DMPA), 455.3 parts of polypropylene glycol mixture (Voranol; OH number=76.6 mg KOH/g; Dow Benelux, The Netherlands) and 0.15 parts of tin octoate were added and the mixture was slowly heated to 95° C. under a dry air atmosphere. The mixture was held at this temperature until the NCO content was 7.59%. Subsequently 24.79 parts of triethylamine were added to the reaction mixture. 650 parts of this mixture were dispersed into a mixture of 1040 parts of water containing 16 parts of a nonyl phenol ethoxylate (Igepal CO-630; Rhodia, Belgium) during 1 hour to form an aqueous dispersion of the NCO-terminated prepolymer. Thereafter 26.5 parts of hydrazine were added as a 64.5% solution in water to chain-extend the prepolymer. The resulting translucent polyurethane dispersion had a solids content of 38.6% and a pH of 7.3. The unsaturated bond functionality was 0 mmoles C=C/g polymer.

EXAMPLE C18

A blend of AP4 with the non-uv curable polyurethane dispersion NR1 was prepared at a solids:solids ratio of acrylic:polyurethane 3:1 (Example 18). This was compared with Example 8, a blend of AP4 with the self-dispersible uv-curable polyurethane dispersion R4 (acrylic:urethane solids to solids 3:1), the results being shown in the following Table 4.

TABLE 4

| Ex. No. | Acrylic Component emulsion | Urethane dispersion | Xylene rubs before uv cure | Xylene rubs after uv cure | Normal Blocking after uv cure |
|---|---|---|---|---|---|
| 8 | AP4 | R4 | 76 | >100 | 4 |
| C18 | AP4 | NR1 | 50 | — | 3 |

The above results show the improved preparation achieved by the presence of the uv-curable component (2) in the invention composition.

Preparation of a Crosslinkable Aqueous Emulsion of an Acrylic Polymer Combination Containing an External Crosslinking Agent but Having a Tg Difference of 1° C. Between the Polymers A and B (AP10)

A combination of two carbonyl functional acrylic polymers having a Tg difference of 1° C. between the first and second formed polymers was prepared using a sequential polymerisation process as follows.

To a round-bottomed flask equipped with a condenser, thermometer and mechanical stirrer, 910.8 parts of water, 1 part of sodium bicarbonate, and 3.1 parts of Surfagene FAZ109V were charged. This mixture was heated to 85° C. At 75° C., 5% of a monomer feed consisting of 216.9 parts of water, 139.0 parts of methyl methacrylate, 39.6 parts of diacetone acrylamide, 32.7 parts of methacrylic acid, 283.5 parts of ethyl acrylate, 9.3 parts of Surfagene FAZ109V, 0.5 parts of sodium bicarbonate, and 22.3 parts of lauryl mercaptane was added. At 80° C., 30% of a catalyst feed consisting of 1.5 parts of ammonium persulphate and 97.5 parts of water was added. 5 minutes after the temperature had reached 85° C. a start was made with the addition of the remainders of the monomer and catalyst feeds. The monomer feed was added over a period of 60 minutes, while the catalyst feed was added over a period of 70 minutes. At the end of the addition of the catalyst feed 39.2 parts of water were used to rinse the feed tank and were added to the reactor. A temperature of 85° C. was maintained for 30 minutes after which the reaction mixture was cooled to 80° C. At 80° C., the emulsion was neutralised using a mixture of 56.6 parts of a 25% solution of ammonia in water and 56.6 parts of water. The reaction mixture was subsequently kept at 80° C. for another 30 minutes before it was cooled to room temperature. The resulting acrylic polymer emulsion had a solids content of 27.2%. The Tg of this first formed acrylic polymer was 21° C.

To a round-bottomed flask equipped with a condenser, thermometer and mechanical stirrer 0.7 parts of ammonium persulphate, and 533.3 parts of the aqueous emulsion of the acrylic polymer formed as above were added. 10% of a monomer feed consisting of 213.4 parts of water, 351.8 parts of n-butyl methacrylate, 10.9 parts of diacetone acrylamide, 800.0 parts of the aqueous emulsion of the acrylic polymer formed as above and 0.4 parts of dimethyl ethanol amine was added after which the temperature was raised to 85° C. At 85° C. the remainder of the monomer feed was added to the reactor over a period of 90 minutes. At the same time the monomer feed was started, a catalyst feed consisting of 42.4 parts of water and 1.1 part of ammonium persulphate was started, which should take 100 minutes. After the catalyst feed had been added the temperature was kept at 85° C. for 30 minutes after which the reaction mixture was cooled to room temperature. At room temperature a solution of 19.8 parts of adipic dihydrazide and 11.6 parts of water was added. The Tg of the second formed acrylic polymer was 20° C. The polymer emulsion had a solids content of 37.8%. The system is crosslinkable on coating formation according to embodiment X.

EXAMPLE C19

A blend of the above-prepared acrylic polymer emulsion AP10 with the uv-curable polyurethane dispersion R4 was prepared at a solids:solids ratio acrylic:polyurethane of 3:1 (Example C19). This was compared with Example 8, a blend of AP4 with R4 (acrylic: polyurethane solids:solids also 3:1).

Blends and formulations were prepared as described above (in Examples C7, 8 to 13). Results are shown in the following Table 5.

TABLE 5

| Ex. No. | Acrylic Component emulsion | Tg of acrylic polymers polymer A | Tg of acrylic polymers polymer B | uv-curable polyurethane dispersion | Hardness before uv cure | Hardness after uv cure | Xylene rubs before uv cure | Xylene rubs after uv cure | Normal Blocking after uv cure |
|---|---|---|---|---|---|---|---|---|---|
| 8 | AP4 | 21° C. | 85° C. | R4 | 113 s | 119 s | 76 | >100 | 4 |
| C19 | AP10 | 21° C. | 20° C. | R4 | 55 s | 67 s | 26 | >100 | 0 |

It is apparent that properties such as surface hardness, blocking and pre-uv cure xylene resistance benefited from a large difference in Tg between polymer A and polymer B.

EXAMPLES 20 AND 21

The purpose of these examples was to vary the concentration of unsaturated double bonds in the polymer of component (2). Example 20 is a blend of the acrylic polymer emulsion AP4 with the self dispersible uv-curable polyurethane dispersion R1 having an unsaturated bond functionality of 0.57 mmoles/g, while Example 21 is a blend of AP4 with self-dispersible commercially available sulphonate-stabilised uv-curable polyurethane dispersion "NeoRad" R-441 (NeoResins, The Netherlands) (denoted R5 herein) having an unsaturated bond functionality of 2.25 mmoles C=C/g polymer. These are for comparison with Example 8 which is a blend of AP4 with the self-dispersible uv-curable polyurethane dispersion R4 having an unsaturated double bond functionality of 1.25 mmoles/g. (The solids:solids ratio acrylic:polyurethane in each case was 3:1). The compositions were formulated as described above (in Examples C7, 8 to 13) and the results of testing are shown in the following Table 6.

TABLE 6

| Ex. No. | Acrylic Component emulsion | Urethane dispersion | concentration of unsaturated double bonds (mmoles/g) | Xylene rubs before uv cure | Xylene rubs after uv cure | Normal Blocking after uv cure |
|---|---|---|---|---|---|---|
| 20 | AP4 | R1 | 0.57 | 80 | >100 | 5 |
| 8 | AP4 | R4 | 1.25 | 76 | >100 | 4 |
| 21 | AP4 | R5 | 2.25 | 83 | >100 | 4–5 |

Preparation of a Crosslinkable Aqueous Dispersion of a Single Acrylic Polymer Containing an External Crosslinking Agent (AP11)

A single carbonyl functional acrylic polymer was prepared as follows.

To a round-bottomed flask equipped with a condenser, thermometer and mechanical stirrer, 709.1 parts of water and 8.2 parts of Surfagene FAZ109V were charged. This mixture was heated to 85° C. At 65° C. 10% of a monomer feed consisting of 287.4 parts of water, 256.2 parts of methyl methacrylate, 39.0 parts of diacetone acrylamide, 23.1 parts of methacrylic acid, 42.2 parts of ethyl acrylate, 272.1 parts of n-butyl methacrylate, 82.9 parts of n-butyl acrylate and 27.6 parts of Surfagene FAZ109V was added. At 75° C., 30% of a catalyst feed consisting of 3.6 parts of ammonium persulphate and 68.1 parts of water was added. 5 minutes after the temperature had reached 85° C. a start was made with the addition of the remainders of the monomer and catalyst feeds. The monomer feed was added over a period of 90 minutes, while the catalyst feed was added over a period of 100 minutes. At the end of the addition of the catalyst feed 100 parts of water were used to rinse the feed tank and were added to the reactor. A temperature of 85° C. was maintained for 30 minutes. Next, free monomer level was further reduced by adding 0.7 parts of iso-ascorbic acid dissolved in 13.6 parts of water followed by 0.9 parts of an 80 weight % solution of t-butyl hydroperoxide and 1.5 parts of water after which the mixture was stirred at 85° C. for another 30 minutes. The batch was cooled to room temperature after which pH was raised to 7.0 by adding 7.6 parts of a 25% solution of ammonia in water and 7.6 parts of water followed by addition of 20.3 parts of adipic acid dihydrazide. The resulting acrylic polymer emulsion had a solids content of 37.5% and a Tg of 37.8° C.

EXAMPLE C22

A blend of the single polymer emulsion AP11 with the self dispersible uv-curable polyurethane dispersion R4 was formed (Example C22). The purpose of making this was for comparison with Example 8 which is the hard and soft two polymer combination acrylic emulsion with R4 (both having a solids:solids acrylic:urethane ratio of 3:1). The blends were formulated and tested as described above (in Examples C7, 8 to 13). The test results are shown in the following Table 7.

TABLE 7

| Ex. No. | Acrylic emulsion | Urethane dispersion | Type of emulsion | Xylene rubs before uv cure | Xylene rubs after uv cure | Normal Blocking after uv cure |
|---|---|---|---|---|---|---|
| 8 | AP4 | R4 | two polymer combination | 76 | >100 | 4 |
| C22 | AP11 | R4 | single polymer | 66 | >100 | 0 |

The results clearly show that blocking properties are completely lost when using the single polymer arylic polymer.

What is claimed is:

1. Aqueous polymer composition suitable for coating which comprises the following components dispersed in water:
    (1) a combination of an acrylic polymer(s) A and an acrylic polymer(s) B where polymer(s) A has a Tg of not more than 30° C. and polymer(s) B has a Tg of at least 35° C., which is at least 25° higher than the Tg of polymer(s) A, and wherein one or both of polymers A and B bear crosslinker functional groups capable of imparting ambient-temperature crosslinkability to component (1) in a coating formed from the composition via the formation of non-radically-formed covalent bonds; and
    (2) a self-dispersible, ionically stabilised polymer having olefinically unsaturated bond functionality capable of imparting radiation-curability thereto in a coating formed from the composition.

2. Composition according to claim 1 wherein one or both of polymers A and B of component (1) bear crosslinker functional groups for reaction with an already present or subsequently added external cross-linking agent having 2 or more groups which are reactable with the crosslinker groups on one or both of polymers A and B to form crosslinking covalent bonds (Embodiment X).

3. Composition according to claim 2 wherein the crosslinker functional groups on one or both of polymers A and B are carbonyl groups and the groups of the external crosslinking agent reactable therewith are carbonyl-reactive amino groups.

4. Composition according to claim 3 wherein said carbonyl-reactive amino groups are provided by —$NH_2$ or —NH— groups which are bound only to a carbon atom(s), or carbonyl-reactive groups derived therefrom.

5. Composition according to claim 3 wherein said carbonyl-reactive amino groups are provided by hydrazine functional groups or carbonyl-reactive groups derived therefrom.

6. Composition according to claim 2 wherein the crosslinker functional groups on one or both of polymers A and B are carboxyl groups and the groups of the external crosslinking agent reactable therewith are selected from aziridine, carbodiimide, cycloaliphatic polyepoxide and epoxy silane groups.

7. Composition according to claim 1 wherein one or both of polymers A and B of component (1) bear crosslinker groups capable of donating lone pairs of electrons to acceptor shells of metal ions of an already present or subsequently added metal compound, acting as an external crosslinking agent, thereby forming coordinate crosslinking bonds (Embodiment X).

8. Composition according to claim 7 wherein said crosslinker groups are carboxyl groups and the metal ions are zinc ions.

9. Composition according to claim 1 wherein each of polymers A and B of component (1) bear different crosslinker functional groups which are reactable with each other (co-reactable) to form crosslinking covalent bonds (Embodiment Y).

10. Composition according to claim 9 wherein the co-reactable groups are carbonyl groups and carbonyl-reactive amino groups.

11. Composition according to claim 10 wherein the carbonyl-reactive amino groups are provided by amino ester groups.

12. Composition according to claim 1 wherein one or both of the acrylic polymers A and B of component (1) bear crosslinker functional groups which are reactable to form non-radically formed covalent crosslinking bonds with the olefinically unsaturated bonds of the polymer of component (2) (Embodiment Z).

13. Composition according to claim 12 wherein the crosslinker functional groups on one or both of acrylic polymers A and B of component (1) are primary or secondary amino groups.

14. Composition according to claim 13 wherein said amino groups are provided by amino ester groups.

15. Composition according to claim 1 wherein one or both of polymers (A) and (B) bear crosslinker groups, and the radiation-curable polymer of component (2) also bears crosslinker groups, these not being the olefinically unsaturated bonds of the polymer of component (2), said crosslinker groups being for reaction with an already present or subsequently added external crosslinking agent having 2 or more groups which are reactable with said crosslinker groups on polymer (A) and/or (B) and on the polymer of component (2) to form crosslinking covalent bonds (Embodiment Q).

16. Composition according to claim 15 wherein the crosslinker groups on one or both of polymer (A) and (B) and on the polymers of component (2) are carboxyl groups, and the groups of the external crosslinking agent reactive therewith are aziridine groups or metal ions.

17. Composition according to claim 1 wherein said radiation-curable polymer of component (2) has an olefinically unsaturated bond functionally of at least 0.25 mmoles C=C/gram polymer.

18. Composition according to claim 1 wherein the ionic stabilisation of said radiation-curable polymer of component (2) is provided by internal anionic dispersing groups.

19. Composition according to claim 18 wherein said polymer of component (2) additionally has nonionic internal dispersing groups.

20. Composition according to claim 1 wherein said radiation-curable polymer of component (2) is a uv-curable polyurethane.

21. Composition according to claim 20 wherein the olefinically unsaturated bonds of the polymer of component (2) are provided by an acryloyl or methacryloyl functional monool or polyol employed in the urethane synthesis.

22. Composition according to either claim 20 or claim 21 wherein the ionic stabilisation of said polyurethane is provided by employing in the synthesis thereof a dihydroxy alkanoic acid of formula:

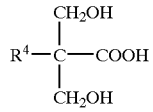

wherein $R^4$ is H or alkyl.

23. Composition according to claim 20 wherein said polyurethane is the chain-extended reaction product of an aqueous dispersed isocyanate-terminated urethane prepolymer and an active hydrogen chain-extending compound.

24. Composition according to claim 1 wherein the acrylic polymers A and B of component (1) have been formed by a sequential polymerisation procedure.

25. Composition according to claim 1 wherein polymer B of component (1) has a Tg which is at least 40° C. higher than that of polymer A.

26. Composition according to claim 1 wherein the weight ratio of polymer A to polymer B in component (1) is within the range of from 30/70 to 90/10.

27. Composition according to claim 1 wherein the weight ratio of the polymers of component (1) to the polymer of component (2) is within the range of from 20/80 to 97/3.

28. Method of coating a substrate using an aqueous composition according to claim 1.

29. Method according to claim 28 wherein the substrate is wood.

30. Method according to claim 29 wherein the substrate is provided by a door or window frame.

31. Coating obtainable or derived from an aqueous composition according to claim 1.

32. Substrate having a coating obtainable or derived from an aqueous composition according to claim 1.

33. Composition according to claim 1 wherein said radiation-curability of the polymer (2) is uv-radiation curability.

34. Composition according to claim 1 wherein polymer(s) B has a Tg of at least 45° C.

35. Composition according to claim 5 wherein the hydrazine functional groups are part of acid hydrazide groups or semi-carbazide groups.

36. Composition according to claim 11 or 14 wherein said amino ester groups are derived by iminating a precursor polymer bearing carboxyl groups.

37. Composition according to claim 15 wherein the crosslinker groups of the radiation curable polymer of component (2) are the same as those of at least one of polymer A and polymer B.

38. Composition according to claim 17 wherein the olefinically unsaturated bond functionality of said radiation curable polymer of component (2) is 0.5 to 3 mmoles C=C/gram polymer.

39. Composition according to claim 18 wherein said internal anionic dispersing groups are carboxylate anion groups or sulphonate anion groups.

40. Composition according to claim 22 wherein said dihydroxyalkanoic acid is 2,2-dimethylol propionic acid.

41. Composition according to claim 25 wherein polymer B of component (1) has a Tg which is at least 50° C. higher than that of polymer A.

42. Composition according to claim 26 wherein the weight ratio of polymer A to polymer B is within the range of 40/60 to 80/20.

43. Composition according to claim 27 wherein the weight ratio of the polymers of component (1) to the polymer of component (2) is within the range of 45/55 to 90/10.

* * * * *